United States Patent
Gunnarsson et al.

(10) Patent No.: US 10,757,591 B2
(45) Date of Patent: Aug. 25, 2020

(54) RADIO NETWORK NODE, NETWORK NODE, WIRELESS DEVICE, AND METHODS PERFORMED THEREIN FOR COMMUNICATING IN A WIRELESS COMMUNICATION NETWORK

(71) Applicant: TELEFONAKTIEBOLAGET LM ERICSSON (PUBL), Stockholm (SE)

(72) Inventors: Fredrik Gunnarsson, Linköping (SE); Icaro L.J. Da Silva, Bromma (SE); Pål Frenger, Linköping (SE); Reza Moosavi, Linköping (SE); Pradeepa Ramachandra, Linköping (SE); Claes Tidestav, Bålsta (SE); Kristina Zetterberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 408 days.

(21) Appl. No.: 15/504,064

(22) PCT Filed: Jan. 4, 2017

(86) PCT No.: PCT/SE2017/050005
§ 371 (c)(1),
(2) Date: Feb. 15, 2017

(87) PCT Pub. No.: WO2018/128563
PCT Pub. Date: Jul. 12, 2018

(65) Prior Publication Data
US 2018/0352453 A1 Dec. 6, 2018

(51) Int. Cl.
*H04W 24/08* (2009.01)
*H04W 36/00* (2009.01)
(Continued)

(52) U.S. Cl.
CPC .......... *H04W 24/08* (2013.01); *H04L 5/0048* (2013.01); *H04W 24/10* (2013.01);
(Continued)

(58) Field of Classification Search
CPC . H04W 36/0083; H04W 16/28; H04W 24/04; H04W 76/18; H04W 24/10
See application file for complete search history.

(56) References Cited

U.S. PATENT DOCUMENTS 8,942,134 B1 * 1/2015 Kludt .................... H04W 16/28
370/252
9,426,712 B2 * 8/2016 Hagerman ............ H04W 36/30
(Continued)

FOREIGN PATENT DOCUMENTS

WO         2014075616  A1       5/2014
WO    WO2014075616  A1 *     5/2014
(Continued)

OTHER PUBLICATIONS

International Search Report and Written Opinion issued in International Application No. PCT/SE2017/050005, dated Dec. 4, 2017, 26 pages.

(Continued)

*Primary Examiner* — Jamaal Henson
(74) *Attorney, Agent, or Firm* — Rothwell, Figg, Ernst & Manbeck, P.C.

(57) ABSTRACT

Embodiments herein relate to a method performed by a wireless device (10) for handling communication in a wireless communication network. The wireless device (10) stores a time instant associated with a receiving event relating to reference signal detection and information related to the receiving event. The wireless device (10) further detects a connection event related to a connection of the wireless device; and reports the time instant and the infor- (Continued)

mation to a radio network node (13) in the wireless communication network.

29 Claims, 16 Drawing Sheets

(51) Int. Cl.
*H04W 76/10* (2018.01)
*H04L 5/00* (2006.01)
*H04W 24/10* (2009.01)
*H04W 16/28* (2009.01)

(52) U.S. Cl.
CPC ....... *H04W 36/0083* (2013.01); *H04W 76/10* (2018.02); *H04W 16/28* (2013.01)

(56) References Cited

U.S. PATENT DOCUMENTS

| | | | |
|---|---|---|---|
| 9,439,174 B2* | 9/2016 | Yu | H04W 16/28 |
| 9,521,597 B2* | 12/2016 | Goransson | H04W 36/0083 |
| 2004/0179544 A1* | 9/2004 | Wilson | H01Q 1/246 |
| | | | 370/442 |
| 2009/0137265 A1* | 5/2009 | Flore | H04W 40/248 |
| | | | 455/525 |
| 2010/0325267 A1* | 12/2010 | Mishra | H04W 24/02 |
| | | | 709/224 |
| 2013/0122891 A1* | 5/2013 | Palm | H04W 8/02 |
| | | | 455/422.1 |
| 2013/0252655 A1* | 9/2013 | Kim | H04B 7/18513 |
| | | | 455/509 |
| 2014/0056220 A1* | 2/2014 | Poitau | H04W 76/14 |
| | | | 370/328 |
| 2014/0064109 A1* | 3/2014 | Krishnamurthy | H04J 11/0053 |
| | | | 370/252 |
| 2014/0194726 A1* | 7/2014 | Mishelevich | A61N 7/00 |
| | | | 600/411 |
| 2015/0215793 A1* | 7/2015 | Siomina | G01S 5/0205 |
| | | | 455/456.1 |
| 2015/0237510 A1* | 8/2015 | Kludt | H04W 16/28 |
| | | | 370/328 |
| 2015/0257051 A1* | 9/2015 | Rao | H04W 36/0066 |
| | | | 455/439 |
| 2015/0327267 A1* | 11/2015 | Wilson | H01Q 1/246 |
| | | | 370/335 |
| 2016/0065294 A1* | 3/2016 | Kang | H04B 7/0695 |
| | | | 370/334 |
| 2016/0105806 A1* | 4/2016 | Noerpel | H04B 7/185 |
| | | | 455/12.1 |

FOREIGN PATENT DOCUMENTS

| | | |
|---|---|---|
| WO | 2016181332 A1 | 11/2016 |
| WO | WO2016181332 A1 * | 11/2016 |

OTHER PUBLICATIONS

3GPP TS 36.300 V14.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016, 317 pages.
NTT DOCOMO: "3GPP TSG RAN Meeting #71; RP-160671, NTT DOCOMO: New SID Proposal: Study on New Radio Access Technology", Discussion 9.1, Mar. 7-10, 2016, Göteborg, Sweden, 8 pages.
3GPP TR 38.913, V0.3.0, 3rd Generation Partnership Project; Technical Specification Group Radio Access Network; Study on Scenarios and Requirements for Next Generation Access Technologies, Release 14, Mar. 2016, 30 pages.
Ericsson: "3GPP TSG-RAN WG2 #93bis; Tdoc R2-162762, 9.5.3: Active Mode Mobility in NR: SINR drops in higher frequencies", Discussion, Decision, Apr. 11-15, 2016, Dubrovnik, Croatia, 4 pages.
3GPP TR 23.799, V0.5.0, 3rd Generation Partnership Project; Technical Specification Group Services and System Aspects; Study on Architecture for Next Generation System, Release 14, May 2016, 120 pages.

* cited by examiner

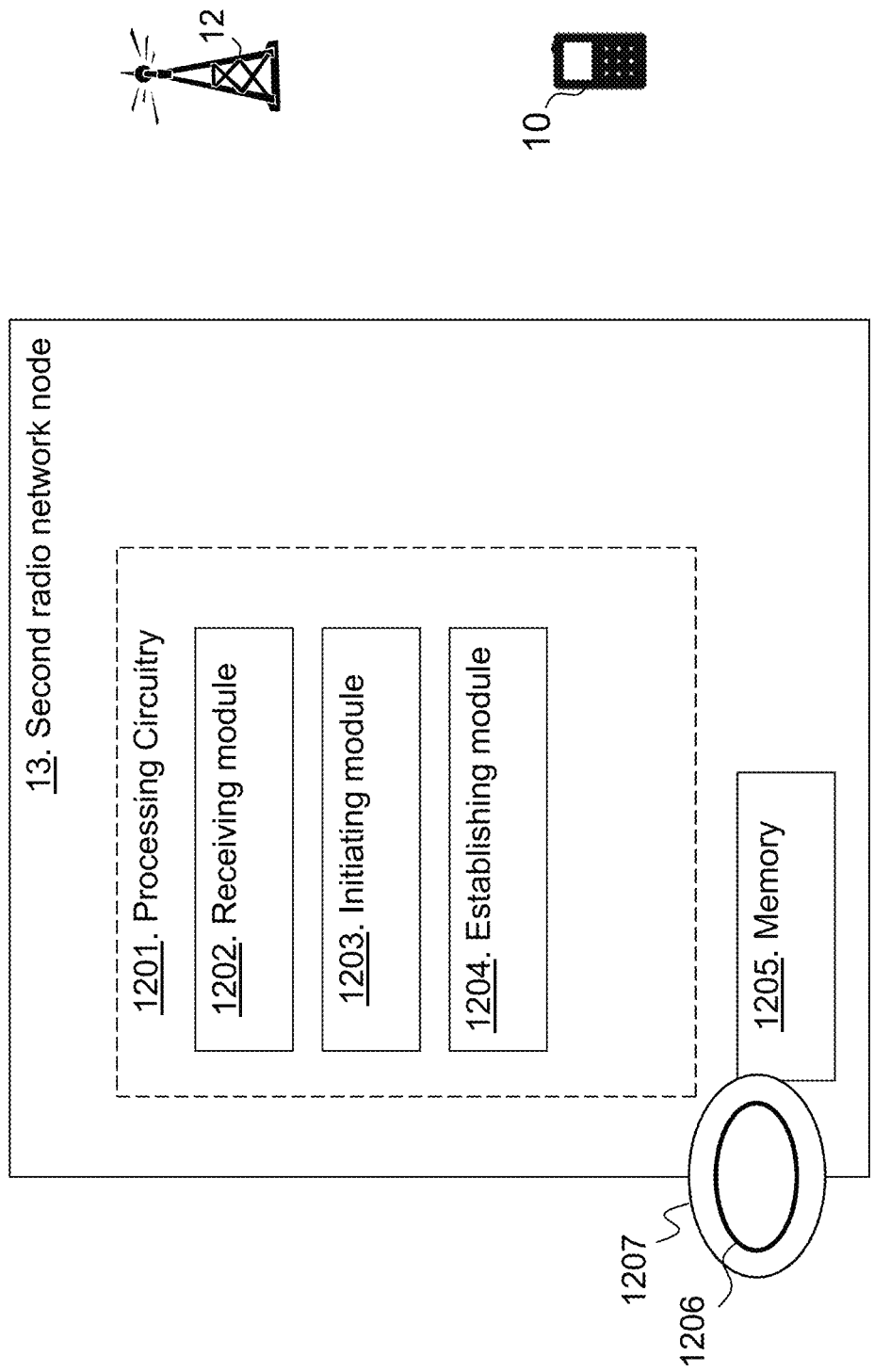

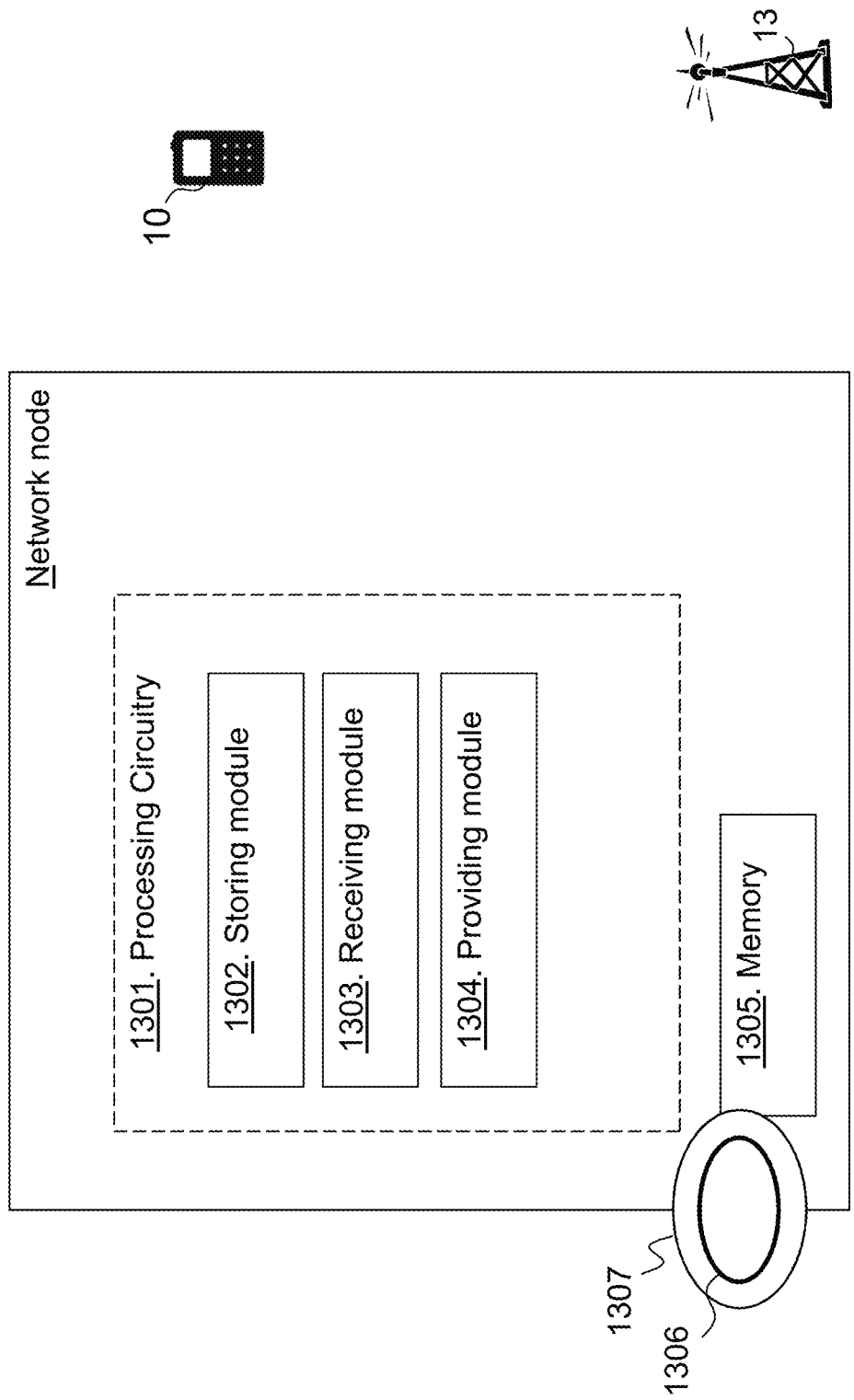

RADIO NETWORK NODE, NETWORK NODE, WIRELESS DEVICE, AND METHODS PERFORMED THEREIN FOR COMMUNICATING IN A WIRELESS COMMUNICATION NETWORK

CROSS REFERENCE TO RELATED APPLICATION

This application is a 35 U.S.C. § 371 National Stage of International Application No. PCT/SE2017/050005, filed Jan. 4, 2017, designating the United States, the disclosure of which is incorporated by reference.

TECHNICAL FIELD

Embodiments herein relate to a radio network node, a network node, a wireless device, and methods performed therein regarding wireless communication. Furthermore, a computer program and a computer-readable storage medium are also provided herein. In particular, embodiments herein relate to communicating in a wireless communication network.

BACKGROUND

In a typical wireless communication network, wireless devices, also known as wireless communication devices, mobile stations, stations (2G) and/or user equipments (UE), communicate via a Radio access Network (RAN) to one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that a transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Overall requirements for the Next Generation (NG) architecture e.g. TR 23.799 v.0.5.0, and, more specifically the NG Access Technology, e.g. TR 38.913 v.0.3.0 will impact the design of the Active Mode Mobility solutions for the New Radio Access Technology (NR), see RP-160671 New SID Proposal: Study on New Radio Access Technology, DoCoMo, compared to the current mobility solution in LTE. Some of these requirements are the need to support network energy efficiency mechanisms, future-proof-ness and the need to support a very wide range of frequencies e.g. up to 100 GHz.

One of the main differences, with respect to LTE, comes from the fact that propagation in frequencies above the ones allocated to LTE is more challenging so that the massive usage of beamforming becomes an essential component of NR. Despite the link budget gains provided by beamforming solutions, reliability of a system purely relying on beamforming and operating in higher frequencies might be challenging, since the coverage might be more sensitive to both time and space variations. As a consequence of that a Signal to Interference plus Noise Ratio (SINR) of a narrow link can drop much quicker than in the case of LTE, see R2-162762, Active Mode Mobility in NR: SINR drops in higher frequencies, Ericsson.

To support Transmit (Tx)-side beamforming at a radio network node, a number of reference signals (RS) may be transmitted from the radio network node, whereby the wireless device can measure signal strength or quality of these reference signals and report the measurement results to the radio network node. The radio network node may then use these measurements to decide which beam(s) to use for the one or more wireless devices.

A combination of periodic and scheduled reference signals may be used for this purpose.

The periodic reference signals, typically called beam reference signals (BRS) or Mobility Reference Signals (MRS), are transmitted repeatedly, in time, in a large number of different directions using as many Tx-beams as deemed necessary to cover a service area of the radio network node. As the naming indicates, each BRS represents a unique Tx-beam from that radio network node. This allows a wireless device to measure the BRS when transmitted in different beams, without any special arrangement for that wireless device from the radio network node perspective. The wireless device reports e.g. the received powers for different BRSs, or equivalently different Tx-beams, back to the radio network node.

The scheduled reference signals, called channel-state information reference signals (CSI-RS), are transmitted only when needed for a particular connection. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of e.g. an NR network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

Beamforming introduces a possibility to enhance the signal towards a specific location. This enables better signal to noise ratio towards a specific wireless device.

A specific beamforming towards a specific wireless device is handled per Transmission Time Interval (TTI) where a number of factors and measurements are used to determine how the beamforming should look like. With an increasing number of antenna elements, the number of possible beams that theoretically can be created increases a lot.

One key design principle currently under consideration for 5G is to base it on an ultra-lean design. This implies that "always on signals" should be avoided from the network as much as possible. The expected benefit from this design principle is expected to be significantly lower network energy consumption, better scalability, higher degree of forward compatibility during the RAT evolution phase, lower interference from system overhead signals and consequently higher throughput in low load scenario, and improved support for user centric beam-forming.

Advanced antenna systems (AAS) is an area where technology has advanced significantly in recent years and where a rapid technology development is foreseen in the years to come. Hence it is natural to assume that advanced antenna systems in general and massive MIMO transmission and reception in particular will be a cornerstone in a future 5G system.

Beam-formed control information, e.g. enhanced Physical Downlink Control Channel (ePDCCH). Beam-forming becomes increasingly popular and capable and therefore it is natural to use it not only for transmission of data but also for transmission of control information. This is one motivation behind the (relatively) new control channel in LTE known as ePDCCH. When the control channel is beam-formed the cost of transmitting the overhead control information can be reduced due to the increased link budget provided by the additional antenna gain. This is a good property that may be utilized also for 5G, perhaps to an even larger degree than what is possible in the current LTE standard.

Radio network nodes may rely on relations or neighbour relationships, either between radio network nodes or between different sectors, controlled by the same or different radio network nodes, or a combination. The neighbour relationships can be only in one direction or mutual. Mechanisms to establish neighbour relationships vary in different wireless communication networks.

The neighbour relationships are illustrated by FIG. 1, where a radio network node can have an isolated or distributed architecture and logical functions are mapped to the architecture. A resource control function (RCF) maintains higher layer aspects of radio connections, while lower layer aspects are handled by a baseband processing function (BPF). FIG. 1 illustrates without loss of generality two RCFs, RCF1, controlling (7) BPF11 and (2) BPF12, and RCF2, controlling (3) BPF21. A BPF can serve one or more transceivers Network node neighbour relationships comprises:
Relationships between RCFs denoted 5 in FIG. 1
Relationships between BPFs denoted 4 in FIG. 1
Relationships between transceivers denoted 6 in FIG. 1
Beams are associated to reference signals, which here are referred to as mobility reference signals, and denoted $MRS_{ijk}$ with i relating to the controlled RCF, j relating to the controlling BPF and k a local enumerable of beams within the BPF. This is just an example of labelling. Beams can reach the wireless device directly, e.g. MRS111, or after one or more reflections, e.g. MRS112.

Neighbour Relationships between beams can be between beams controlled by
    the same BPF, like MRS111 and MRS112
    different BPFs, but the same RCF, like MRS111 and MRS121
    different BPFs and RCFs, like MRS111 and MRS211

A robustness of a radio connection, also referred to as connection or a signal connection, depends on the radio resource management situation associated with the serving radio network node or nodes, as well as the radio conditions associated to alternative radio network nodes. Such radio network nodes may be alternative candidates to serve the wireless device, but may also induce interference to hamper the radio connection. The mechanisms to ensure the robustness of the radio connection depend on the means to interact with the wireless device such as the frequency of radio condition status information, and the frequency of resource control command opportunities. Moreover, such procedures may rely on neighbour relationships, and suffer from absence of neighbour relationships.

When the radio connection robustness fails, it may be due to the absence of a neighbour relationship and that existing mechanisms to establish such a neighbour relationship have failed, which is a problem with existing solutions resulting in a reduced or limited performance of the wireless communication network.

SUMMARY

An object of embodiments herein is to provide a mechanism that improves the performance of the wireless communication network when performing beamforming in a wireless communication network.

According to an aspect the object is achieved by providing a method performed by a wireless device for handling communication in a wireless communication network. The wireless device stores a time instant associated with a receiving event relating to reference signal detection and information related to the receiving event. Furthermore, the wireless device detects a connection event related to a connection of the wireless device, and reports the time instant and the information to a radio network node in the wireless communication network.

According to another aspect the object is achieved by providing a method performed by a second radio network node for handling communication in a wireless communication network. The second radio network node receives, from a wireless device, a time instant associated with a receiving event relating to reference signal detection at the wireless device and information related to the receiving event, which reference signal is associated with a first radio network node. The second radio network node further initiates a process to establish a neighbour relationship of the first radio network node and a neighbouring radio network node or of beams in the wireless communication network using the received time instant and the received information.

According to yet another aspect the object is achieved by providing a method performed by a network node for handling communication in a wireless communication network. The network node stores an indication of a reference signal and a timing information defining when the reference signal was transmitted from a first radio network node or another radio network node. Furthermore, the network node receives, from a second radio network node, a time instant associated with a receiving event relating to reference signal detection at a wireless device and information related to the receiving event. The network node further provides an identity of the first or the other radio network node based on the stored indication of the reference signal and the stored timing information mapping to the received time instant and received information related to the receiving event.

It is herein also provided a computer program comprising instructions, which, when executed on at least one processor, causes the at least one processor to carry out the methods herein, as performed by the wireless device, the first radio network node or the second radio network node. Furthermore, it is herein provided a computer-readable storage medium, having stored thereon a computer program comprising instructions which, when executed on at least one processor, cause the at least one processor to carry out the methods herein, as performed by the wireless device, the first radio network node or the second radio network node.

According to still another aspect the object is achieved by providing a wireless device for handling communication in a wireless communication network. The wireless device is configured to store a time instant associated with a receiving event relating to reference signal detection and information related to the receiving event. The wireless device is further configured to detect a connection event related to a connection of the wireless device; and to report the time instant and the information to a radio network node in the wireless communication network.

According to yet still another aspect the object is achieved by providing a second radio network node for handling communication in a wireless communication network. The second radio network node is configured to receive, from a wireless device, a time instant associated with a receiving event relating to reference signal detection at the wireless device and information related to the receiving event, which reference signal is associated with a first radio network node. The second radio network node is further configured to initiate a process to establish a neighbour relationship of the first radio network node and a neighbouring radio network node or of beams in the wireless communication network using the received time instant and the received information.

According to another aspect the object is achieved by providing a network node for handling communication in a wireless communication network. The network node is configured to store an indication of a reference signal and a timing information defining when the reference signal was transmitted from a first radio network node or another radio network node. The network node is further configured to receive, from a second radio network node, a time instant associated with a receiving event relating to reference signal detection at a wireless device and information related to the receiving event. Furthermore, the network node is configured to provide an identity of the first or the other radio network node based on the stored indication of the reference signal and the stored timing information mapping to the received time instant and received information related to the receiving event.

According to embodiments herein, when using radio network node identifiers and beam/RS identifiers that may change over time, establishment of neighbour relationships are initiated using the reported time instant and information. This will lead to a flexible wireless communication network with an improved performance. The embodiments herein enable the wireless communication network to interpret e.g. measurement reports from the wireless device in a correct way and use received information to build up knowledge of actual neighbour relationships and may thereby avoid future radio link problems and failures.

BRIEF DESCRIPTION OF THE DRAWINGS

Embodiments will now be described in more detail in relation to the enclosed drawings, in which:

FIG. 12 is a block diagram depicting a second radio network node according to embodiments herein; and FIG. 13 is a block diagram depicting a network node according to embodiments herein.

DETAILED DESCRIPTION

Figure 1:
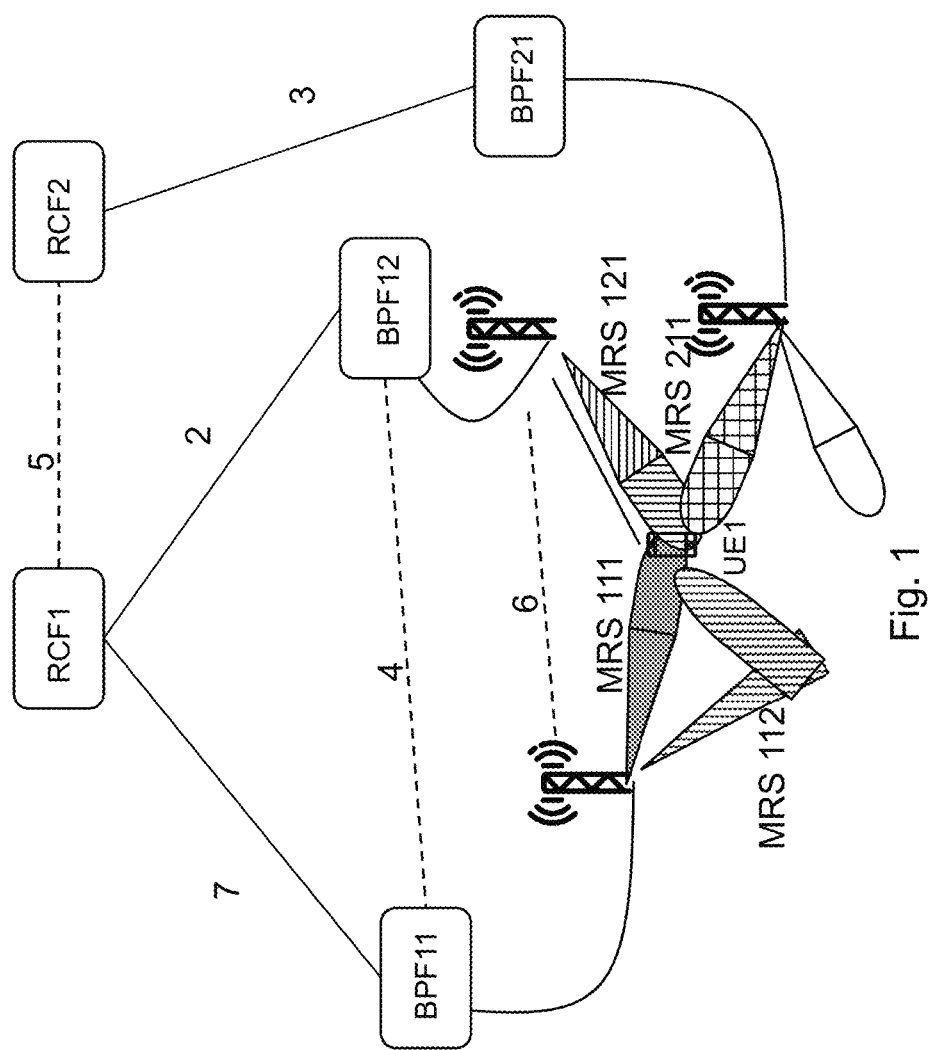
FIG. 1 shows a schematic overview depicting a wireless communication network according to prior art.
Figure 2A:
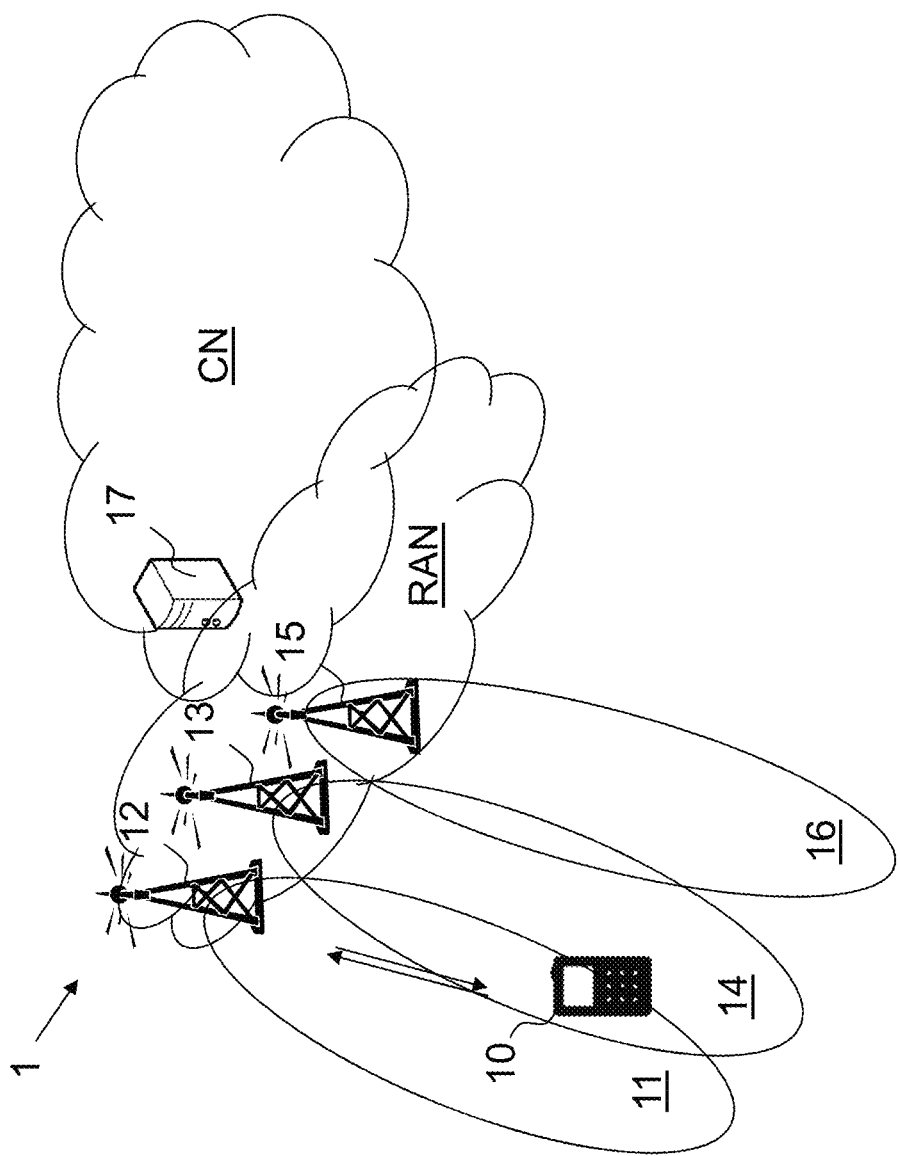
FIG. 2a shows a schematic overview depicting a wireless communication network according to embodiments herein.

Embodiments herein relate to wireless communication networks in general. FIG. 2a is a schematic overview depicting a wireless communication network 1. The wireless communication network 1 comprises one or more RANs and one or more CNs.

The wireless communication network 1 may use one or a number of different technologies, such as Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a network node. The network node is exemplified herein as a first radio network node 12, providing radio coverage over a geographical area, a first service area 11 or a first beam, of a first radio access technology (RAT), such as NR, LTE, Wi-Fi, WiMAX or similar. The radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node 12 wherein the first service area may be referred to as a serving beam, and the serving radio network node serves the wireless device 10 and communicates with the wireless device 10 in form of DL transmissions to the wireless device 10 and UL transmissions from the wireless device 10. The network node may also be exemplified herein as a core network node or an operation and maintenance node being a controlling network node 17.

A second radio network node 13 may further provide radio coverage over a second service area 14 or a second beam of a second RAT, such as NR, LTE, Wi-Fi, WiMAX or similar. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour radio network node wherein the second service area 14 may be referred to as a neighbouring beam or target beam. The first and second RAT may be the same RAT or different RATs. In the illustrated example also a third radio network node 15 providing radio coverage over a third service area 16 is disclosed. It should be noted that the second radio network node 13 may be a non-neighbouring radio network node and the third radio network node 15 may be a neighbouring radio network node to the first radio network node 12 (not illustrated).

The radio network nodes may have an isolated or distributed architecture and logical functions may be mapped to the architecture. An RCF may maintain higher layer aspects of radio connections, while lower layer aspects may be handled by a BPF.

It should be noted that a service area may be denoted as cell, beam, mobility measurement beam, beam group or similar to define an area of radio coverage. The radio network nodes transmit reference signals (RS) or beam-formed RSs over respective service area. Hence, the radio network nodes may transmit MRS or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. a first MRS, for identifying the first service area 11 in the wireless communication network 1. The second radio network node 13 provides radio coverage over the second service area 14 using a second reference signal, e.g. a second MRS, for identifying the second service area 14 in the wireless communication network. The third radio network node 15 provides radio coverage over the third service area 16 using a third reference signal, e.g. a third MRS. These reference signals, first, second and third MRSs, may be initiated upon request from a radio network node, e.g. a neighboring radio network node, or configured to be sent continuously.

In flexible wireless communication networks, radio network node identifiers and beam identifiers may change over time, meaning that a measurement or a decoded identifier is not unique or enough to identify a radio network node or a beam unless the time of measurement or detection is provided. Therefore, when the wireless device 10 is a subject to a radio link problem or when in idle mode, the wireless device 10 according to embodiments herein stores a time instant, with respect to a time reference, associated to radio network nodes and beams. This time instant is reported to a radio network node, such as the second radio network node 13, e.g. where or when a signaling connection has been established. The second radio network node 13 may then use the reported time instant along with information indicating serving radio network node or previous received reference signal for initiating a process to establish a neighbour relationship between radio network nodes, e.g. between the first radio network node 12 and the second radio network node 13, or beams in the wireless communication network 1. In a traditional wireless communication network the beamforming of antenna ports are typically fixed in time. This is primarily due to that both idle mode functions, such as system information provisioning required to enable wireless devices to perform initial access, and active mode functions, such as transmission and reception of user plane data, both use the same antenna ports. In such a wireless communication network, if the antenna beamforming changes, e.g. for the purpose of optimizing an active mode user data transmission, this will impact the coverage area of the system, something that is typically not accepted. In upcoming wireless communication networks it is expected a much higher degree of dynamic beamforming compared to e.g. 4G LTE. This is partly enabled by a more stringent logical separation of idle and active mode functionalities and signals which makes it possible to dynamically beamform active mode related signals without affecting idle mode functionality. A problem that may arise then is that e.g. a measurement report from a wireless device cannot be properly understood by e.g. the second radio network node 12. Embodiments herein solve this problem by associating each e.g. measurement report from the wireless device 10 with a time instant of measurement or other receiving event such that a network node e.g. the controlling network node 17 can compare the measurement performed by the wireless device 10 with a past configuration of the wireless communication network 1 at the time instant of e.g. the measurement. Hence, embodiments herein enable the second radio network node and the network node to interpret e.g. the measurement reports from the wireless device 10 in a correct way and use the information to build up knowledge of the actual neighbour relationships and may thereby avoid e.g. future radio link problems and failures.

Figure 2B:
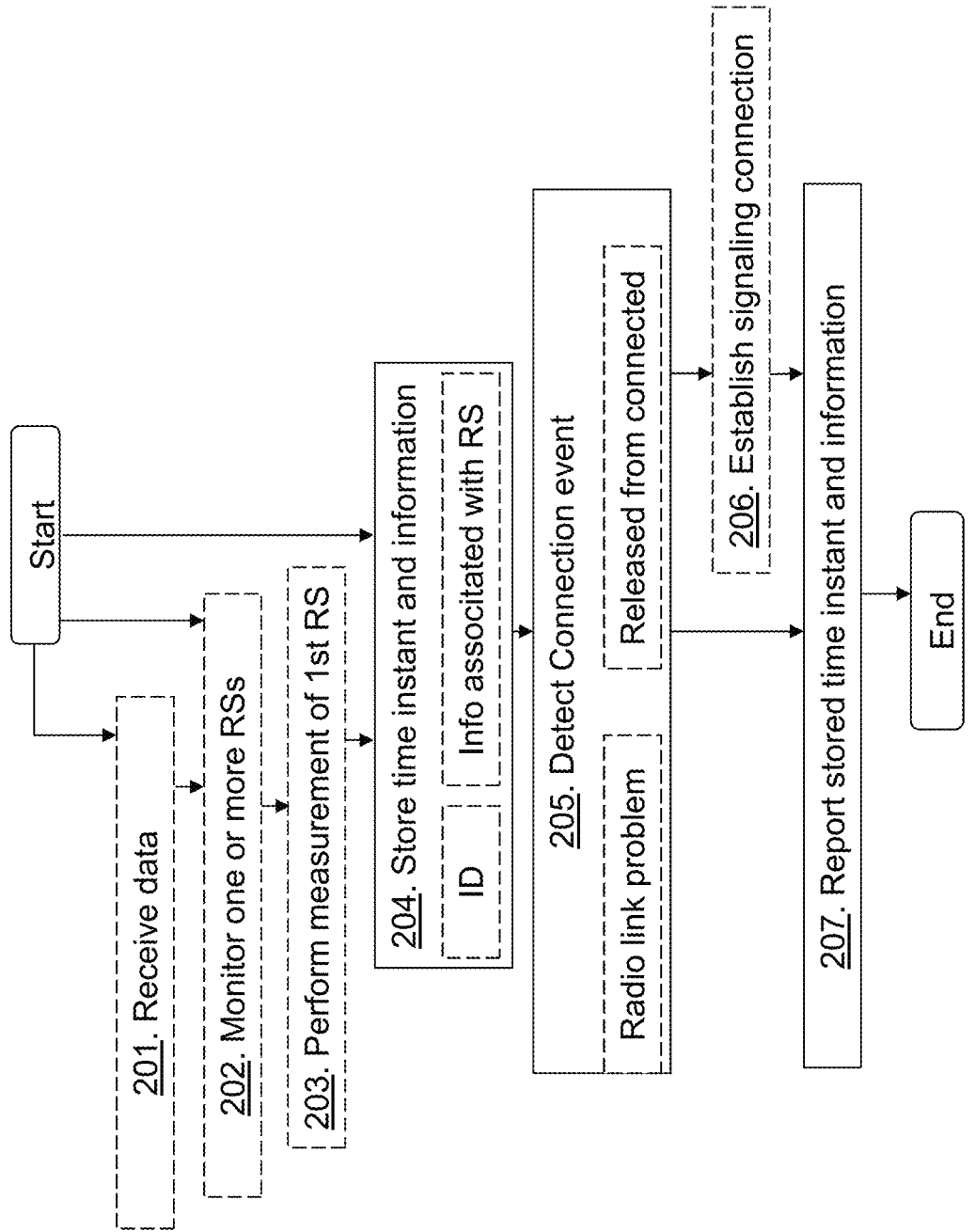
FIG. 2b is a schematic flowchart depicting a method performed by a wireless device according to embodiments herein.

The method actions performed by the wireless device 10 for handling communication in a wireless communication 1 according to some embodiments will now be described with reference to a flowchart depicted in FIG. 2b. The actions do not have to be taken in the order stated below, but may be taken in any suitable order. Actions performed in some embodiments are marked with dashed boxes. As stated above the wireless device 10 may be served by the serving radio network node 12 also referred to as the first radio network node 12.

Action 201. The wireless device 10 may receive from the serving radio network node 12, data comprising reference signals to monitor and/or an identifier of the serving radio network node 12. The wireless device 10 may e.g. receive configuration data comprising the reference signals to monitor and/or the identifier of the serving radio network node 12.

Action 202. The wireless device 10 may monitor one or more reference signals from the serving radio network node 12 in the wireless communication network. The reference signals may be provided by the serving radio network node, one or more of non-serving radio network nodes, or a combination of serving and non-serving radio network nodes.

Action 203. The wireless device 10 may perform a measurement of a first reference signal.

Action 204. The wireless device 10 stores the time instant associated with a receiving event relating to reference signal detection and information related to the receiving event. A receiving event may be when receiving an ID of the serving radio network node such as the first radio network node 12, or when measuring (or detecting) a reference signal. Thus, the wireless device 10 may store the time instant when the wireless device 10 receives the identifier of the serving radio network node, or the time instant when measuring the first reference signal. The information related to the receiving event may comprise the identifier of the serving radio network node and/or information associated to the first reference signal such as beam ID, RS IDs such as MRS ID, radio network node ID, cell ID, frequency related information e.g. component carrier ID or radio link bandwidth related parameters such as start and stop frequency and similar. Embodiments herein relate to handling of time instants at the wireless device 10. The wireless device 10 will identify, store and report time instances associated to the reception of a configuration, detection/measurement of a reference signal etc. The time instant can refer to the most recent time instant a signal/identify was configured/detected/measured. The time instant can also refer to a first time instant a signal/identify was configured/detected/measured. The meaning can be configured dedicatedly to the wireless device or pre-configured. The time instant may be expressed in absolute terms, such as in terms of a globally agree time reference such as provided by Global Navigation Satellite System (GNSS). The time reference may also be expressed in relation to a network time reference such as a frame number associated to a radio network node. One example is the system frame number (SFN) in LTE.

Action 205. The wireless device 10 detects a connection event related to a connection of the wireless device 10. The connection event may be a radio link problem such as a radio link failure (RLF), or that the connection is released from a connected state e.g. the wireless device enters idle state or inactive state. Thus, the wireless device 10 may detect the radio link problem of the connection or that the connection is released from the connected state and may upon detection of the connection event keep the stored time instant with the information related to the receiving event such as ID of the serving radio network node or measurements and RS IDs.

Action 206. The wireless device 10 may establish a signaling connection to the radio network node, such as the second radio network node 12, after detecting the connection event.

Action 207. The wireless device 10 further reports the time instant and the information to the radio network node in the wireless communication network. This may be performed after or when the wireless device 10 (re)establishes the signaling connection to e.g. the second radio network node 13 or when reentering into connected mode. The wireless device 10 may thus report the time instant and information using the signaling connection. The wireless device 10 may report the time instant and the identifier of the serving radio network node to another radio network node such as the second radio network node 13 or the third radio network node 15.

Figure 2C:
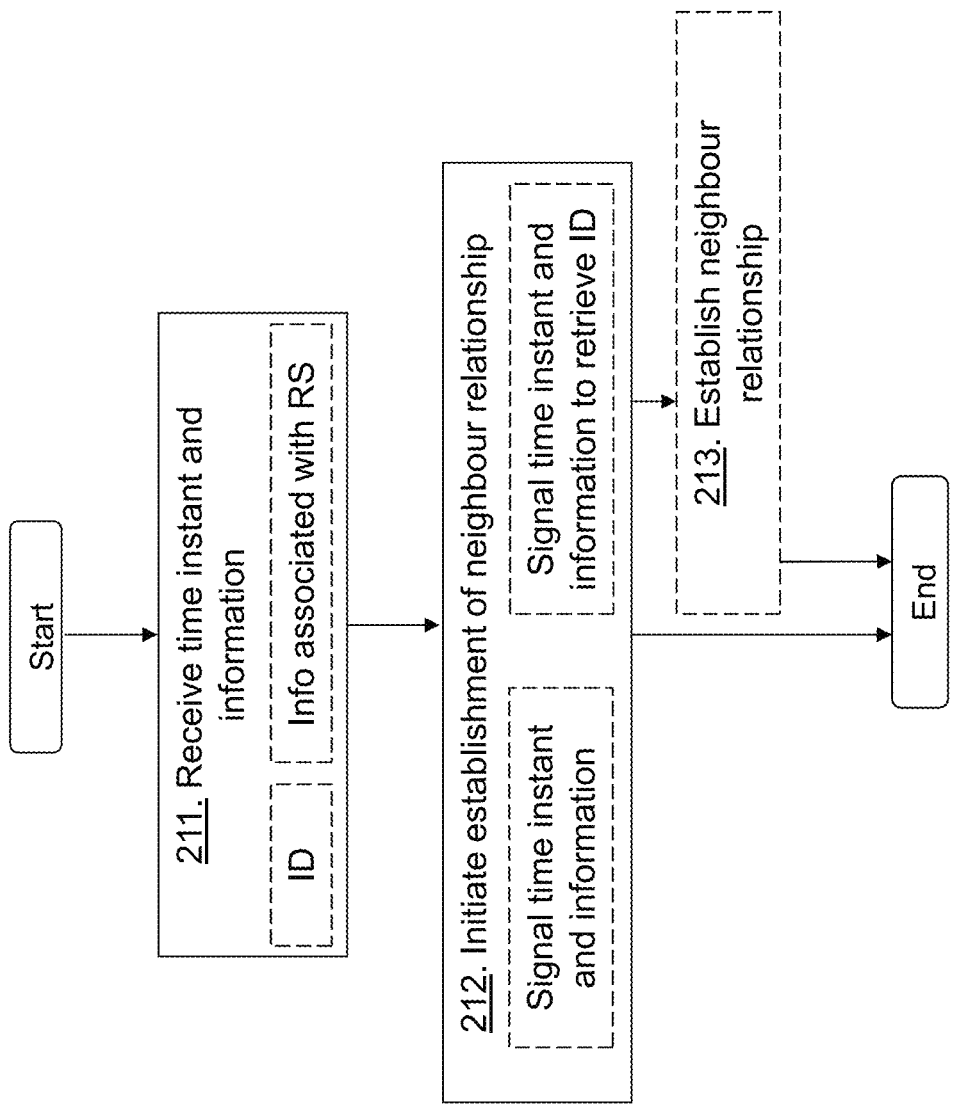
FIG. 2c is a schematic flowchart depicting a method performed by a second radio network node according to embodiments herein.

The method actions performed by the second radio network node 13 for handling communication in the wireless communication network according to some embodiments will now be described with reference to a flowchart depicted in FIG. 2c. Actions performed in some embodiments are marked with dashed boxes. As stated above the wireless device 10 may previously be served by the serving radio network node 12.

Action 211. The second radio network node 13 receives, from the wireless device 10, the time instant associated with the receiving event relating to reference signal detection at the wireless device, and the information related to the receiving event. The reference signal is associated with the first radio network node 12. The information related to the receiving event may comprise the identifier of the serving radio network node and/or information associated to the first reference signal such as beam ID, RS IDs such as MRS ID, radio network node ID, cell ID and/or similar.

Action 212. The second radio network node 13 initiates a process to establish a neighbour relationship of the first radio network node and a neighbouring radio network node or of beams in the wireless communication network 1 using the received time instant and the received information. It should be noted that when the second radio network node 13 is of a distributed architecture the BPF may receive the signalling from the wireless device 10 and the RCF may establish the neighbour relationship. For example, the second radio network node 13 may signal the time instant and the information to a network node, e.g. the first radio network node 12 or a controlling network node 17, to retrieve identity of the first radio network node 12 associated to the receiving event. Alternatively, the second radio network node 13 may signal the time instant and the information to the third radio network node 15 allowing the third radio network node 15 to establish a neighbour relationship to the first radio network node 12 based on the signaled time instant and the signaled information. For example, the wireless device 10 may wake up in a beam of a radio network node not being a neighbouring beam/radio network node to the first radio network node 12.

Action 213. The second radio network node 13 may establish the neighbour relationship with the first radio network node 12 associated to the receiving event using the retrieved identity. Establishing a neighbour relationship may comprise setting up an X2-like connection between radio network nodes.

Embodiments herein may improve the performance of the wireless communication network in terms of enabling proper handover for wireless devices in the future. As the first and the second radio network node is aware of the presence of a new neighbouring radio network node, the respective radio network node may request for the reference signal transmission from the neighbouring radio network node and handover the wireless device without any handover failure. Furthermore, the first or the second radio network node and the newly established neighbour radio network node may participate in a load sharing/balancing optimization wherein a lowly loaded radio network node among the said two radio network nodes could aggressively beamform in those areas, areas where there is a coverage overlap between the said nodes, to capture more wireless devices and hence enabling load reduction in the other radio network node.

Figure 2D:
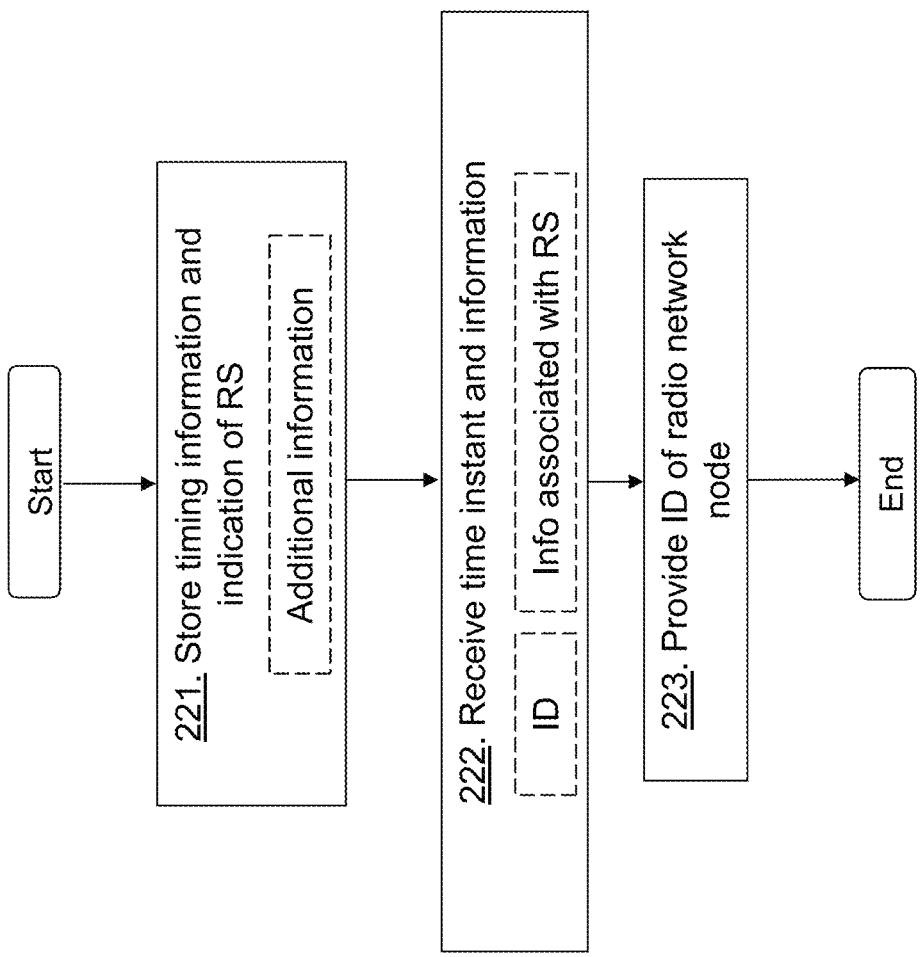
FIG. 2d is a schematic flowchart depicting a method performed by a network node according to embodiments herein.

The method actions performed by the network node, such as the first radio network node 12 or the controlling node 17, for handling communication in the wireless communication network according to some embodiments will now be described with reference to a flowchart depicted in FIG. 2d. Actions performed in some embodiments are marked with dashed boxes. As stated above the network node may be a serving radio network node serving the wireless device or be a controlling network node.

Action 221. The network node stores an indication of the reference signal and the timing information defining when the reference signal was transmitted from the first or another radio network node. The timing information may be an interval when the reference signal was transmitted or a start and stop time or similar. The network node may further store additional information being one or more of: periodicity of transmissions of the reference signal and transmission area of the reference signal.

Action 222. The network node receives, from the second radio network node 13, the time instant associated with the receiving event relating to reference signal detection at the wireless device 10 and information related to the receiving event. The information related to the receiving event may comprise the identifier of the serving radio network node and/or information associated to the first reference signal such as beam ID, RS IDs such as MRS ID, radio network node ID, cell ID and/or similar.

Action 223. The network node provides the identity of the first or the other radio network node based on the stored indication of the reference signal and the stored timing information mapping to the received time instant and received information related to the receiving event. E.g. the first radio network node 12 retrieves the identity of the first radio network node when the time instant is within the interval defined by the stored timing information, and the received information indicates the RS stored at the first radio network node for that time interval.

Figure 3:
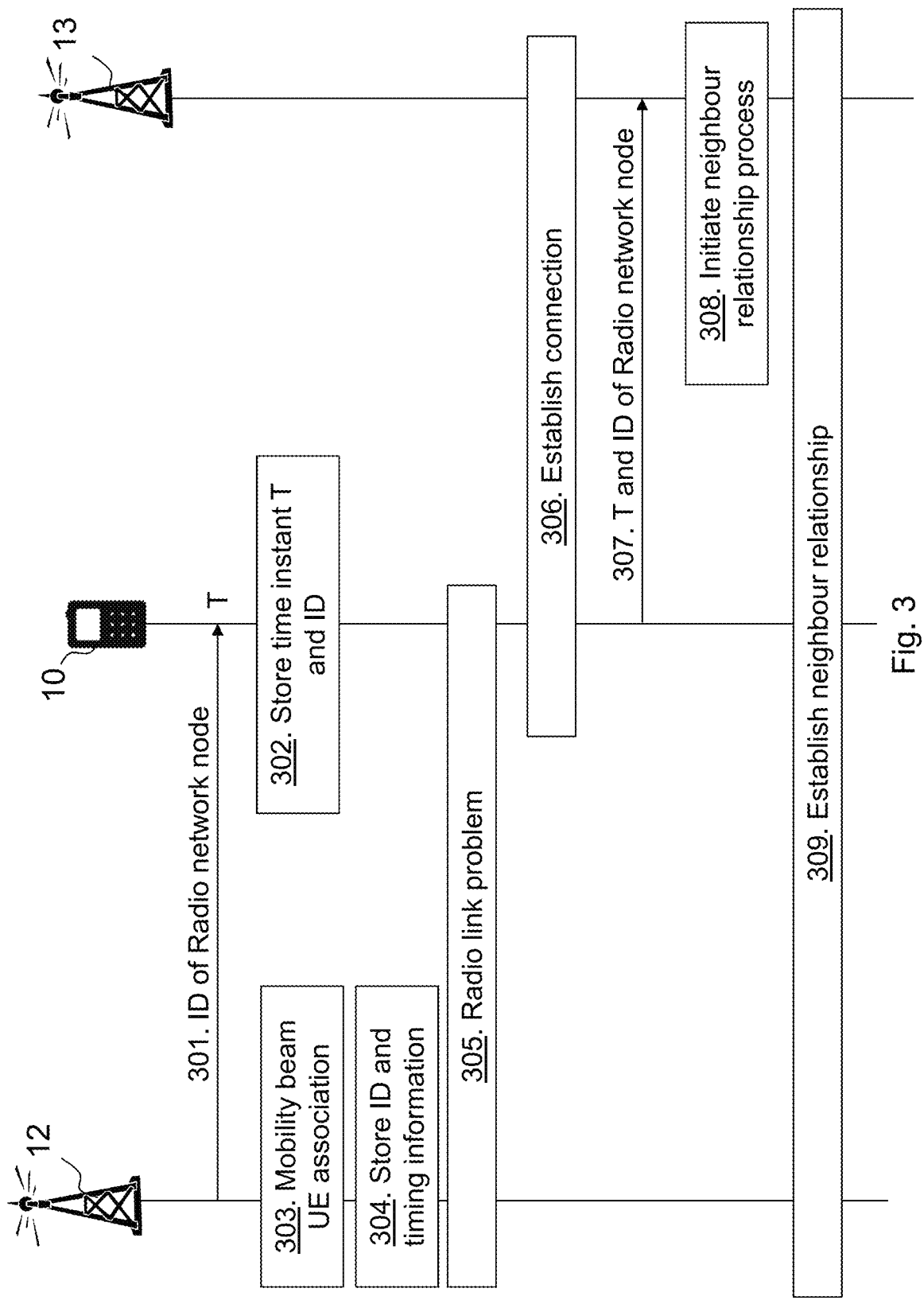
FIG. 3 is a schematic combined flowchart and signaling scheme according to embodiments herein.

FIG. 3 is a combined flowchart and signaling scheme according to some embodiments herein. In the illustrated example the first radio network node 12 is serving the wireless device 10.

Action 301. The first radio network node 12 may transmit the identity of the serving radio network node to the wireless device 10.

Action 302. The wireless device 10 may thus receive the ID of the serving radio network node at time instant T and stores the time instant T along with the ID of the serving radio network node.

Action 303. The first radio network node 12 may perform a mobility beam wireless device (or UE) association, e.g. that the wireless device 10 uses a certain RS of a port or a beam. An RS is associated with a port also referred to as an antenna port, i.e. when the first wireless device 10 is using a particular RS, it can be equivalently said that the first wireless device 10 is using the RS or beam of the port that corresponds to the particular RS. If the RS is beam-formed, i.e. transmitted with a multi-antenna precoding vector that generates a beam in a certain pointing direction, one can say that the first wireless device 10 is using a beam-formed RS or a port of the beam.

Action 304. The first radio network node 12 stores the indication of the reference signal associated with the wireless device 10 and the timing information defining when the reference signal was transmitted from the first radio network node 12.

Action 305. The wireless device 10 detects a radio link problem such as a RLF dropping the connection to the first radio network node 12.

Action 306. The wireless device 10 may then perform a reestablishment process reestablishing the signaling connection to the second radio network node 13.

Action 307. The wireless device 10 may then report the time instant and the information to the second radio network node 13 over the signaling connection.

Action 308. The second radio network node 13 may initiate neighbour relationship process using the reported time instant and information. It should be noted that second radio network node 13 also may associate the wireless device 10 to a reference signal at the second radio network node 13.

Action 309. The second radio network node 13 may then establish the neighbour relationship e.g. using the identity of the first radio network node to establish a connection between the first radio network node 12 and the second radio network node 13.

Figure 4:
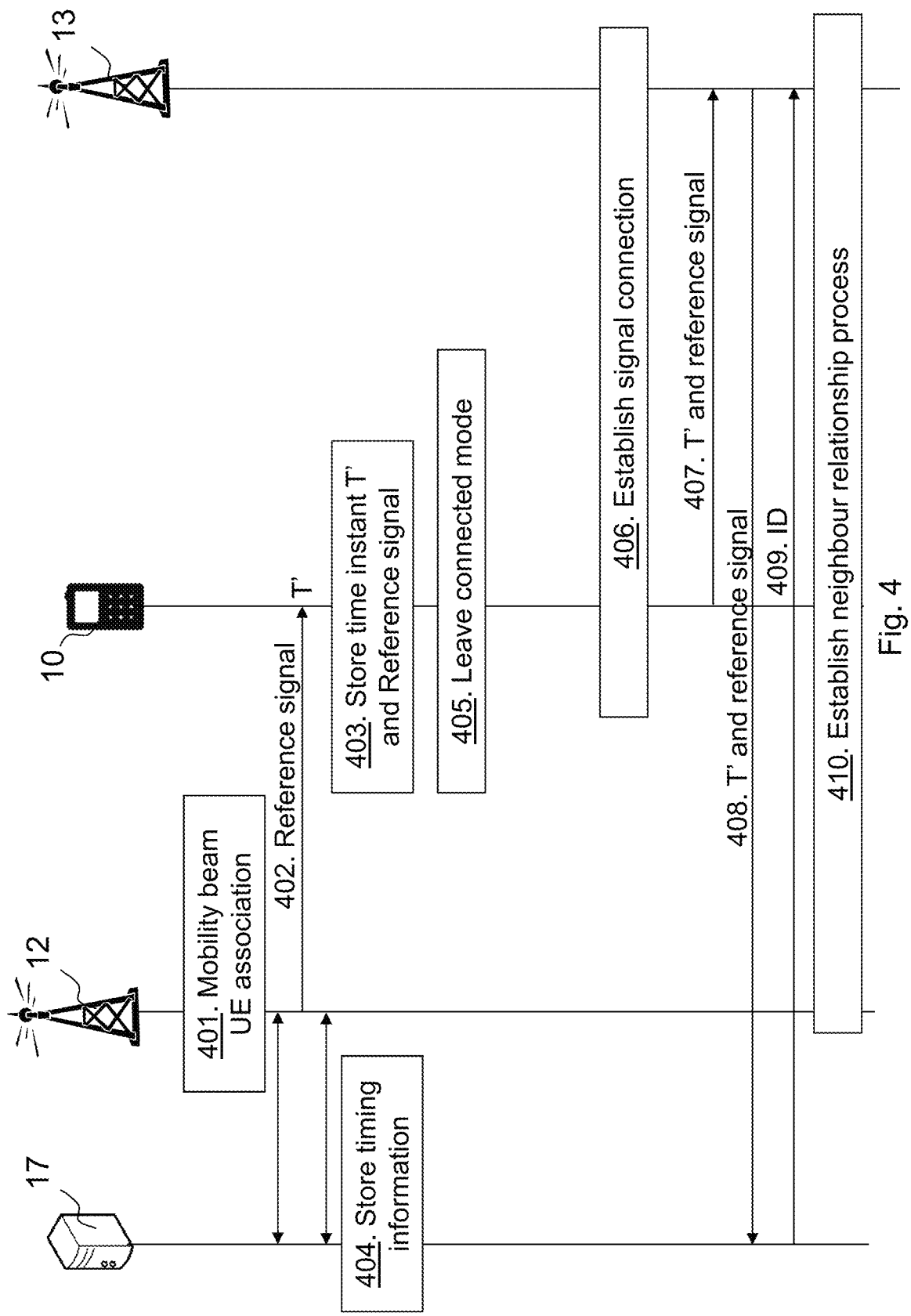
FIG. 4 is a schematic combined flowchart and signaling scheme according to embodiments herein.

FIG. 4 is a combined flowchart and signaling scheme according to some embodiments herein. In the illustrated example the first radio network node 12 is serving the wireless device 10 and the controlling network node 17 controls the transmissions of the RSs.

Action 401. The first radio network node 12 may perform a mobility beam wireless device association, e.g. that the wireless device 10 uses a certain RS of a port or a beam. The first radio network node may exchange information with the controlling network node 17, which information indicates RS to transmit for certain beams and also time intervals to transmit the RS.

Action 402. The first radio network node 12 transmits the RS at a time instant T'.

Action 403. The wireless device 10 may detect RS and measure signal strength or quality of the received RS. According to embodiments herein, the wireless device 10 stores the time instant T' the wireless device 10 detected or measured the RS along with the information associated with the RS such as RS identity.

Action 404. The controlling network node 17 may store the timing information of the RS indicating when the RS was transmitted from the first radio network node 12.

Action 405. The wireless device 10 may then release the connection from the connected state e.g. to an idle state.

Action 406. At a later time, the wireless device 10 enters into connected mode have data to receive or transmit and establishes the signal connection to the second radio network node 13, e.g. when entering connected mode in the second service area 14.

Action 407. The wireless device 10 further reports the stored instant time T' and the information associated with the RS, e.g. RS ID to the second radio network node 13. This may be performed during the establishment of the signal connection or afterwards.

Action 408. The second radio network node 13 may signal to the controlling network node 17 the instant time T' and the information associated with the RS, e.g. RS ID.

Action 409. The controlling network node 17 may from the stored timing information of the RS indicating when the RS was transmitted from the first radio network node 12, retrieve that the identity of the first radio network node 12. This identity may be signalled back to the second radio network node 13 as a response to a request from the second radio network node 13.

Action 410. The second radio network node 13 may then establish the neighbour relationship e.g. using the identity of the first radio network node 12 to establish a connection between the first radio network node 12 and the second radio network node 13.

Figure 5:
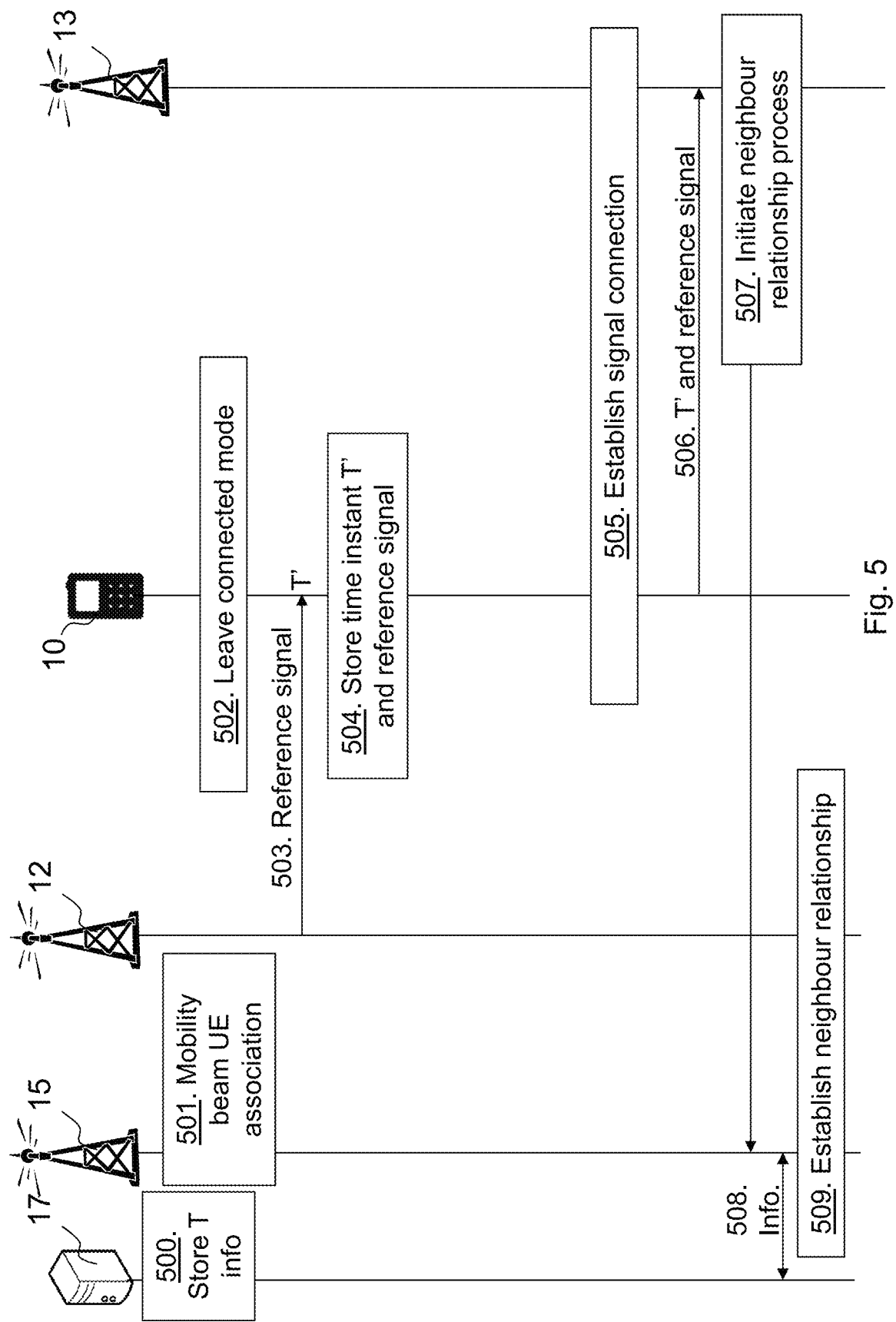
FIG. 5 is a schematic combined flowchart and signaling scheme according to embodiments herein.

FIG. 5 is a combined flowchart and signaling scheme according to some embodiments herein. In the illustrated example the third radio network node 15 is serving the wireless device 10 and the controlling network node 17 controls the transmissions of the RSs.

Action 500. The controlling network node 17 may store the timing information of the RS indicating when the RS was transmitted from the third radio network node 15.

Action 501. The third radio network node 15 may perform a mobility beam wireless device association, e.g. that the wireless device 10 uses an initial RS of a port or a beam.

Action 502. The wireless device 10 may then release a connection to the third radio network node 15 from the connected state e.g. to an idle state.

Action 503. During the idle state, the wireless device 10 may perform a measurement of the reference signal from the first radio network node 12.

Action 504. The wireless device 10 stores the time instant when the measurement was made, including information such as measurement details. In case of receiving the identity of the first radio network node 12, the wireless device 10 instead stores the time instant when it received the identity and the identity.

Action 505. At a later time, the wireless device 10 enters into connected mode have data to receive or transmit and establishes the signal connection to the second radio network node 13, e.g. when entering connected mode in the second service area 14.

Action 506. The wireless device 10 further reports the stored instant time T' and the information associated with the RS, e.g. RS ID to the second radio network node 13. This may be performed during the establishment of the signal connection or afterwards. E.g. once the wireless device 10 has reconnected to the wireless communication network, the wireless device 10 may indicate the availability of an idle mode log to the second network node 13. The second radio network node 13 may then request the wireless device 10 to report the logged data in idle mode, and the wireless device 10 may report to the second network node 13 the logged idle mode measurement(s) and time instant(s) as well as previous serving radio network node i.e. the third radio network node 15.

Action 507. The second radio network node 13 may then initiate a neighbor relations ship process by signaling the time instant and the information to the third radio network node 15.

Action 508. The third radio network node 15 may exchange information with the controlling network node 17, which information time intervals when the RS was transmitted from the first radio network node 12.

Action 509. The third radio network node 15 may then establish the neighbour relationship e.g. using the identity of the first radio network node 12 to establish a connection between the first radio network node 12 and the third radio network node 15.

Embodiments herein ensure that as much as possible can be learned from radio link problem incidents and/or when releasing the connection from a connected state, also in radio networks with flexible configurations and time variant identifiers and/or reference signals. The procedure is not aiming at completely avoiding any radio link problems but to learn from the once that occur, and thereby build the logical model of the wireless communication network.

Using embodiments herein also allow for more aggressive beamforming since the problems associated with losing the wireless device in the serving beam can be exploited to improve the logical model of the network. Thereby, future connections in the same region can be more robustly handled since necessary neighbour relationships have been established based on the information retrieved from the failure caused by the aggressive beamforming. In essence, more aggressive beamforming means that the margins for robustness are tighter, but also that the failures caused can be exploited to ensure that failures do not repeat.

Note that in a general scenario the term "radio network node" can be substituted with "transmission point". The key observation is that it must be possible to make a distinction between the transmission points (TPs), typically based on MRSs or different synchronization signals and BRSs transmitted. Several TPs may be logically connected to the same radio network node but if they are geographically separated, or are pointing in different propagation directions, the TPs will be subject to the same issues as different radio network nodes. In subsequent sections, the terms "radio network node" and "TP" can be thought of as interchangeable.

Figure 6:
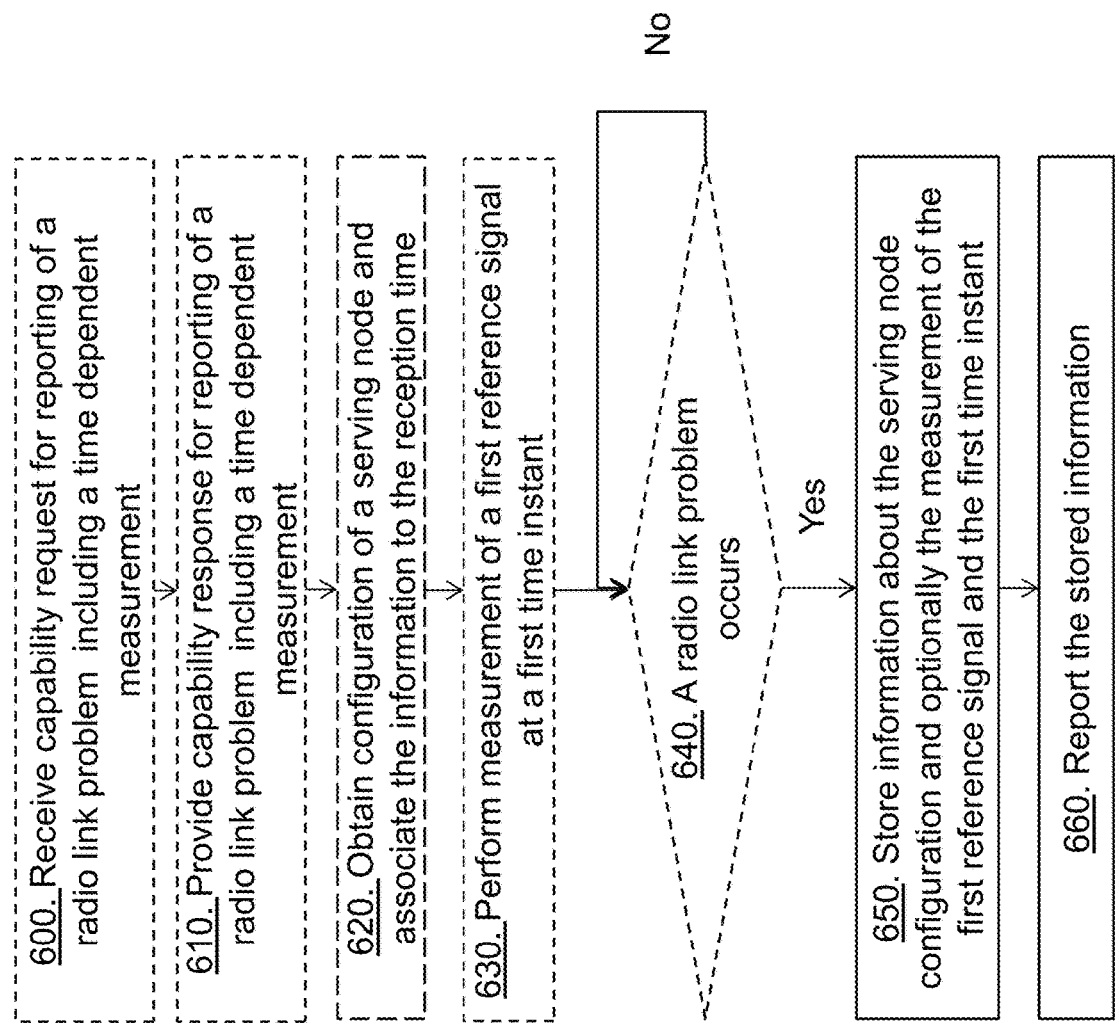
FIG. 6 is a schematic flowchart depicting a method performed by a wireless device according to some embodiments herein.

FIG. 6 shows an embodiment of the method performed by the wireless device 10. The radio link problem reporting handling or idle mode logging reporting may optionally be associated to a capability procedure, where the wireless device 10 is requested to report its capabilities regarding RLP reporting and/or idle mode logging reporting (Action 600: Receive capability request for reporting of a RLP including a time dependent measurement). The capability comprises reception of a serving network node identifier, determination of detection time instances associated to reference signal detection, storing capabilities of detected reference signals and detection times, serving network node identifier and reception time, and reporting capabilities. The wireless device 10 provides to the serving radio network node, information about its capabilities (Action 610: Provide capability response for reporting of a RLP including a time dependent measurement).

The wireless device 10 may receive a configuration that comprises a serving network node identifier (Action 620: Obtain configuration of a serving node and associate the information to the reception time). The configuration may be for preparing to RLP and/or idle mode logging reporting. The identifier may be complete, or may be combined with an identifier component broadcasted or transmitted by the serving radio network node to form a serving radio network node identifier or base station ID (BSID). At the same time, the wireless device 10 records the reception time or the time instant. In case of a combined identifier, the wireless device 10 may also record the time instant such as the reception time of the broadcasted/transmitted identifier component.

The wireless device 10 may also be configured to detect and store detected reference signals and associated detection time instants. The wireless device 10 may record the first occurrence, the most recent occurrence or similar of the reference signal, either based on configuration or via pre-configuration.

The wireless device 10 may also either receive a configuration of reference signals to monitor and a search space in time and frequency, or may be monitoring reference signals blindly. The configuration can be received as part of the configuration of action 620. Once the wireless device 10 has detected a reference signal, it records the reception time (Action 630: Perform measurement of a first RS at a first time instant).

The wireless device 10 may also optionally be configured with a timer. Each time the wireless device 10 detects a reference signal, an instance of the timer is started and the wireless device 10 saves information about detected reference signals and the detection time instant in memory. Once the timer expires, the wireless device 10 deletes information about the detected reference signal. In that way the stored information may not be outdated when reported to another radio network node.

The wireless device 10 may detect whether a RLP occurs or not (Action 640). A radio link problem can be defined as when a radio link is subject to significant communication errors, or even becomes unavailable for communication, either transmission or reception. RLP can be triggered when an error rate of a channel is estimated to be above a threshold, a received reference signal condition, strength, quality etc, is below a threshold, a missing response to an UL transmission etc. In one embodiment, the RLP concerns a link to an anchor radio network node responsible for a signal radio bearer. In such cases, the RLP is sometimes referred to as a radio link failure, RLF.

When the wireless device 10 has declared RLP, it will stop any running timers for detected reference signals and ensure that the stored information remains stored (Action 650: Store information about serving node configuration and optionally the measurement of the first RS and the first time instant). The wireless device 10 may also record the time of RLP, and may initiate an estimation procedure, possibly with a wider search space compared to what has been in use before declaring RLP. The wider search space can be configured beforehand via the serving radio network node, or pre-configured.

When the wireless device 10 re-establishes a link with the second radio network node 13, it optionally either provides or indicates existence about information associated to a previous RLP. Optionally, the second network node 13 may request information about the RLP. The wireless device 10 may provide (Action 660: Report the stored information) information about the previous RLP to the second radio network node 13.

In another embodiment, the wireless device 10 may consider measurements of more than one reference signal (comprising first and second reference signals, but not excluding more than two reference signals). In particular, the focus is at the case when the first reference signal is associated to a beam that in turn is associated to the first radio network node 12, and the second reference signal is associated to a beam that in turn is associated to a different radio network node.

Figure 7:
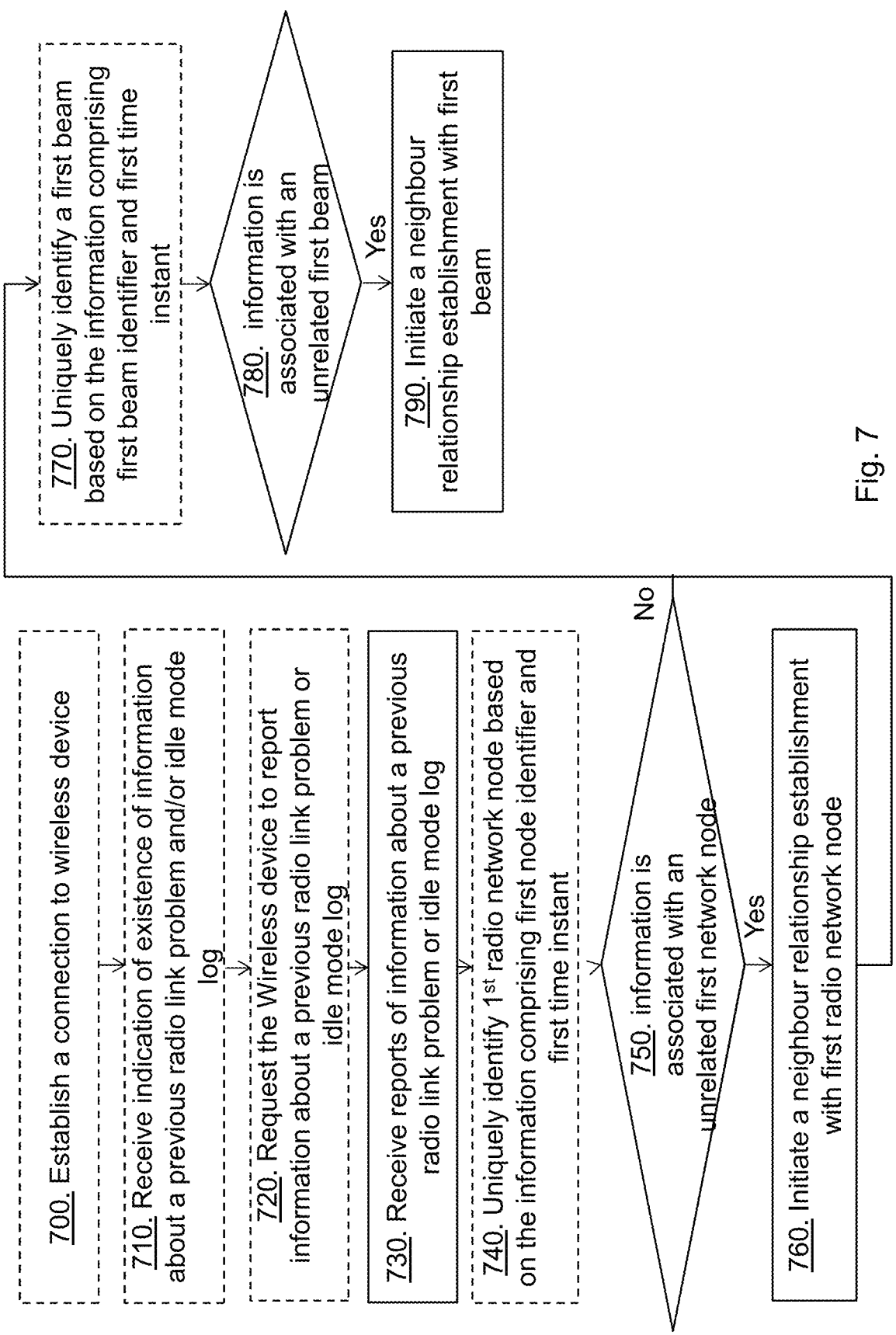
FIG. 7 is a schematic flowchart depicting a method performed by a second radio network node according to some embodiments herein.

FIG. 7 shows an embodiment of the method performed by the second radio network node 13. The second radio network node 13 establishes a connection or signal connection to the wireless device 10 (Action 700). The second radio network node 13 may receive an indication of existence of information about a previous RLP and/or idle mode log (Action 710). Optionally, the second radio network node 13 may request information about the RLP or the idle mode log (Action 720). The second network node may receive a report or reports comprising information about the previous RLP or idle mode log from the wireless device 10 (Action 730). Idle mode logging is explained with reference to FIG. 10 below. The information about a previous radio link problem may include the time instant associated to the first radio network node 12 and the detection/measurement time instants associated to one or more beams. The second radio network node 13 may uniquely identify the first radio network node 12 based on the information comprising the first node identifier and the first time instant (Action 740). If the first radio network node 12 of the information is previously unrelated to the second radio network node 13 (Action 750: Information is associated with an unrelated first radio network node), the second radio network node 13 initiates a neighbour relationship establishment with the first radio network node 12 (Action 760).

Establishing a relation between a first beam and an associated radio network node. The reference signal and time instant information from e.g. the RLP information, can be used to uniquely identify a first beam. In some embodiments, the second radio network node 13 identifies that the reference signal and time instant of the first beam matches its records of past configurations of reference signals. Hence, the second radio network node 13 may uniquely identify the first beam based on the information comprising the first beam identifier and the first time instant (Action 770). The second radio network node 13 sends information about the reference signal and time instant to a neighbor network node (the neighbor network node may be the first radio network node 12, or a different radio network node). If it matches the records of the neighbor network node concerning past configurations, it sends a first beam identifier.

If the first beam of the information is previously unrelated to the second radio network node (Action 780: Information is associated with an unrelated first beam), then the second radio network node 13 initiates a neighbour relationship establishment with the first beam (Action 790).

Similarly, the second radio network node 13 may note antenna configuration parameters at the time of radio link establishment. This can include information about the uplink reception antenna beam, or reported downlink reference signals associated to a downlink antenna beam. In one embodiment, the reference signal used as reference for the random access of the reestablishment procedure may be subject to a beam.

In this case, the first beam information is sent to the previous serving radio network node from the RLP information. In this case, it is the first radio network node 12 (previous serving radio network node) that is the associated radio network node, and thereby the neighbour relationship is established between the first radio network node and the first beam.

Figure 8:
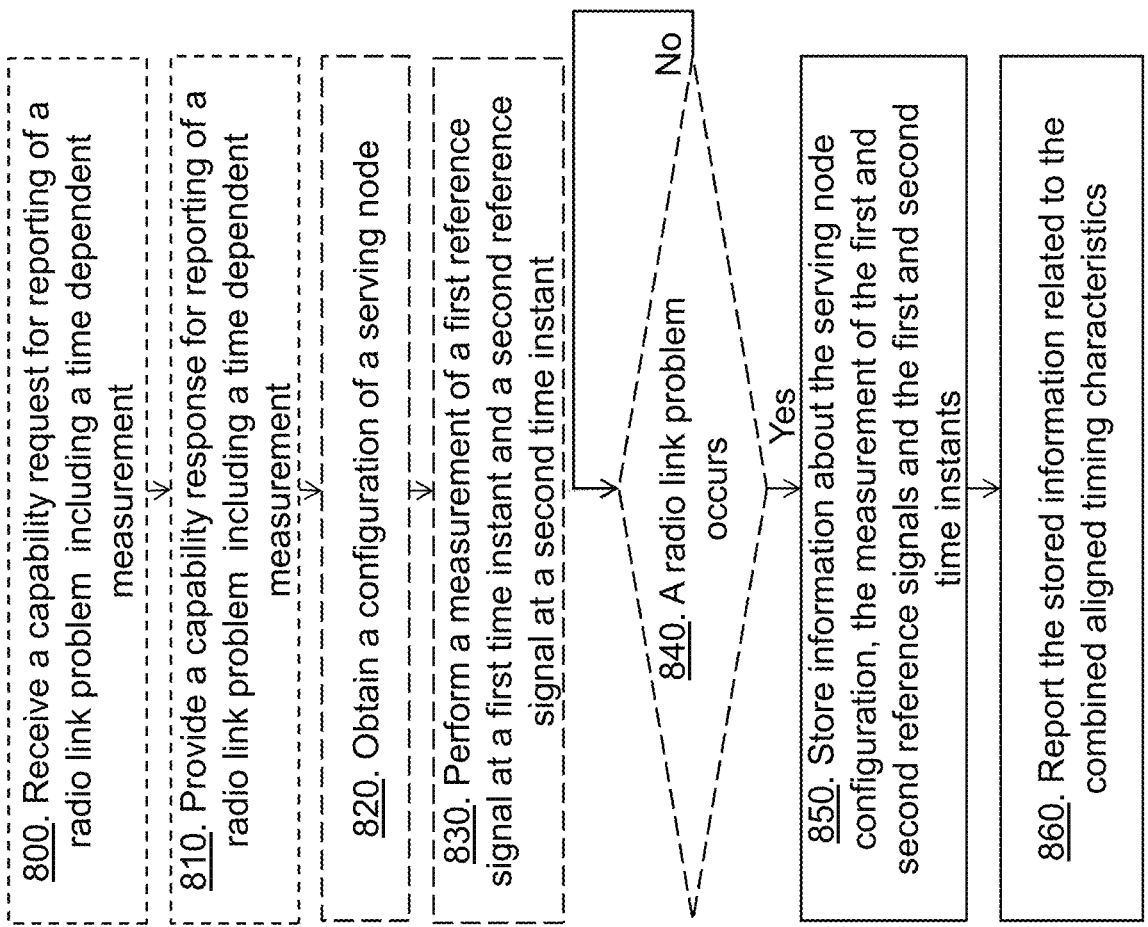
FIG. 8 is a schematic flowchart depicting a method performed by a wireless device according to some embodiments herein.

FIG. 8 describes a flow chart corresponding to the flow chart in FIG. 6 but for the case when the wireless device 10 measures and reports two reference signals. The wireless device 10 receives a capability request for reporting of a RLP including a time dependent measurement (Action 800). The wireless device 10 provides a capability response for reporting of a RLP including a time dependent measurement (Action 810). The wireless device 10 obtains configuration of a serving node (Action 820). The wireless device 10 performs a measurement of the first reference signal at the first time instant and a second reference signal at a second time instant (Action 830). The wireless device 10 determines whether a RLP occurs (Action 840). The wireless device 10 stores information about the serving node configuration, the measurements of the first reference signal at the first time instant and the second reference signal at the second time instant (Action 850). The wireless device 10 reports the stored information including the measurements of the first reference signal at the first time instant and the second reference signal at the second time instant (Action 860: Report the stored information related to the combined aligned timing characteristics).

Figure 9:
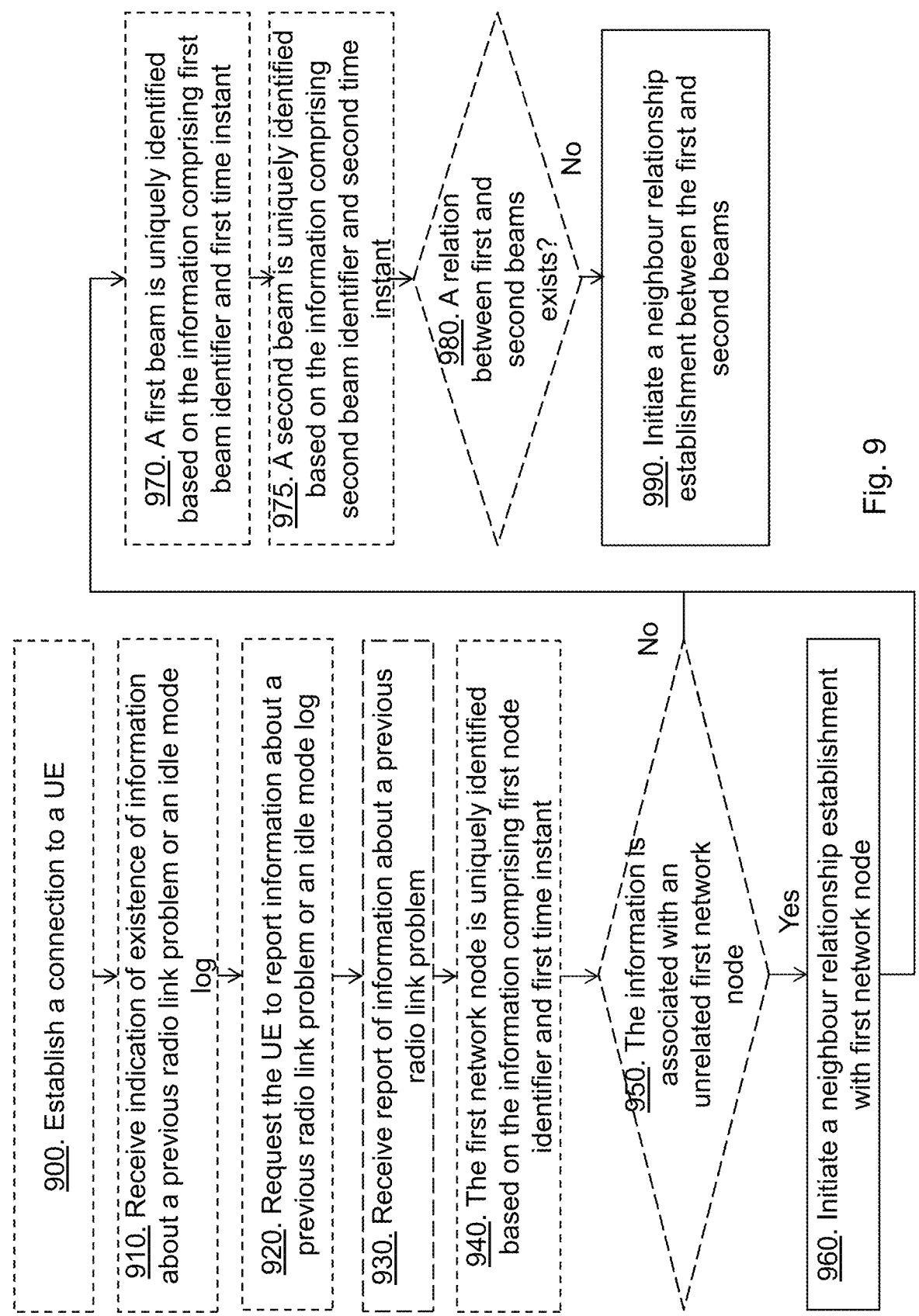
FIG. 9 is a schematic flowchart depicting a method performed by a second radio network node according to some embodiments herein.

FIG. 9 describes a flow chart corresponding to the flow chart in FIG. 6 but for the case when the wireless device 10 measures and reports two reference signals. The second network node 13 optionally establishes a link with the wireless device 10 (Action 900). The wireless device 10 optionally indicates existence about information associated to a previous RLP or an idle mode log (Action 910). Optionally, the second radio network node 13 may request the wireless device 10 to report information about RLP or idle mode log (Action 920). The second network node 13 may receive a report about the previous RLP or idle mode log from the wireless device 10 (Action 930). Idle mode logging is explained with reference to FIG. 10 below.

The information comprises a previous serving radio network node (first radio network node) identifier and the time instant when the information was retrieved, which can be used to uniquely identify the previous serving radio network node (Action 940). The previous serving radio network node identifier may be matched to an existing list of neighbour relationships to other radio network nodes (Action 950: Is the information associated with an unrelated first network node?). If the previous serving radio network node identifier is not present in the list, the second radio network node 13 may initiate a neighbour relationship establishment between the first radio network node and the second radio network node (Action 960).

Furthermore, the relationship may be one-directional or mutual, where the latter means that there is a relationship between the first and second radio network nodes from a first radio network node perspective as well as from a second radio network node perspective.

The identifier and neighbour relationship can also be used to establish a connection between the first and second network nodes as is known in the art. E.g. the second radio network node 13 may request a transport network layer, TNL, address information of the first radio network node 12 from a separate radio network node by using the previous serving radio network node identifier as key, e.g. like a domain name server, (DNS), or the second radio network node 13 sends the TNL address request to a separate network node such as the controlling network node 17, which will relay the request to the first radio network node 12 using the previous serving radio network node identifier as key. In addition, also the time instant when the wireless device 10 received the previous serving radio network node identifier can be used as part of the key above. The use of the time instant is crucial in case the previous serving radio network node identifier is changing over time.

The information in the RLP report can also be used to establish neighbour relationships between a radio network node and a beam, or between beams.

FIG. 9 further captures differences in the flow chart compared to FIG. 7, when a first and second beam information are considered.

In case both first and second beam information is available (Action 970: A first beam is uniquely identified based on the information comprising a first beam identifier and a first time instant, Action 975: A second beam is uniquely identified based on the information comprising a second beam identifier and a second time instant). The beam information may stem from either the RLP information or the associated beam of the second radio network node 13 described above. In this embodiment, the existence of a relation is investigated (Action 980: A relation between the first and second beams exists?), and if not a neighbour relationship is established between the first and second beams (Action 990). The neighbour relationship may be mutual or one-directional.

Idle Mode Logging

Figure 10:
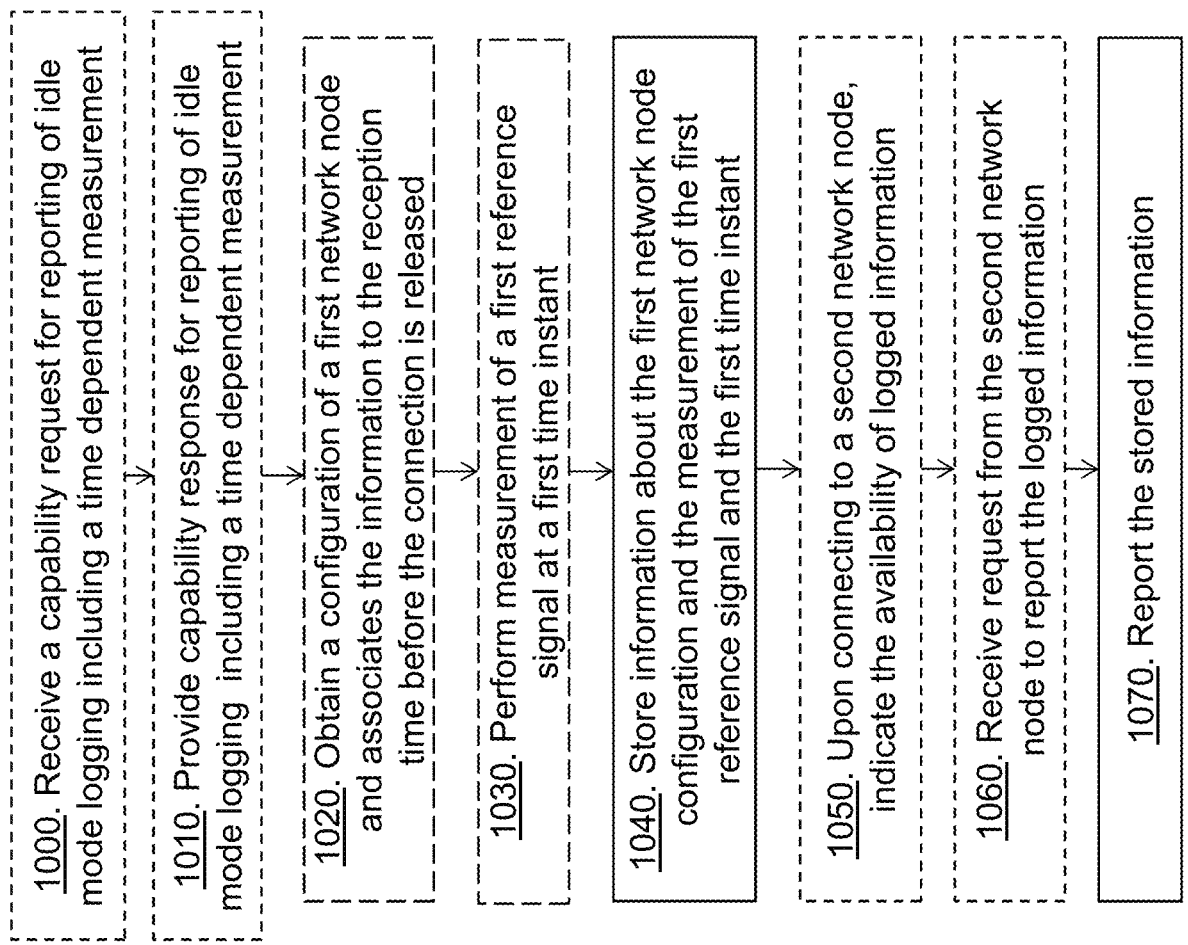
FIG. 10 is a schematic flowchart depicting a method performed by a wireless device according to some embodiments herein.

FIG. 10 illustrates, from the wireless device perspective, an embodiment with the idle mode logging, and reporting once the wireless device 10 is reconnected to the wireless communication network 1.

Optionally, the wireless device 10 receives a request from a serving radio network node to report the capability of the wireless device for reporting of idle mode logging including a time dependent measurement (Action 1000), and the wireless device 10 optionally responds (Action 1010: Provide capability response for reporting of idle mode logging including a time dependent measurement.).

The wireless device 10 obtains a configuration from a serving radio network node, for example including reference signals to monitor, search spaces, a serving node identifier, and then the wireless device 10 releases the connection with the wireless communication network (Action 1020: Obtain a configuration of a first network node and associate the information to the reception time before the connection is released). In idle mode, the wireless device 10 performs a measurement of a first reference signal at a first time instant (Action 1030) and stores the first time instant when the measurement was made, including measurement details (Action 1040: Store information about the first network node configuration and the measurement of the first reference signal and the first time instant). In case of the serving node identifier, the wireless device 10 instead or additionally stores the time instant when it received the identifier. Once the wireless device 10 has reconnected to the wireless communication network, the wireless device 10 optionally indicates the availability of an idle mode log to the radio network node (Action 1050: Upon connecting to the second network node indicate the availability of logged information). The second radio network node 13 optionally requests the wireless device 10 to report the logged data in idle mode (Action 1060: Receive request from the second network node to report the logged information). The wireless device 10 may then finally report the stored information to the radio network node 13 such as the logged idle mode measurements (Action 1070).

Embodiments herein concern neighbour relationships establishment procedures based on radio link problem/failure/idle mode reporting information, wherein beams/nodes/entities are associated to identifiers that may be altered over time, and therefore, both the identifier and the time instant when the identifier was acquired/detected/measured/decoded are reported to the second radio network node 13.

Based on the time instant, the radio network node can either determine or lookup the identifier of a radio network node or beam, either via stored information in the radio network node or in a different radio network node.

Figure 11:
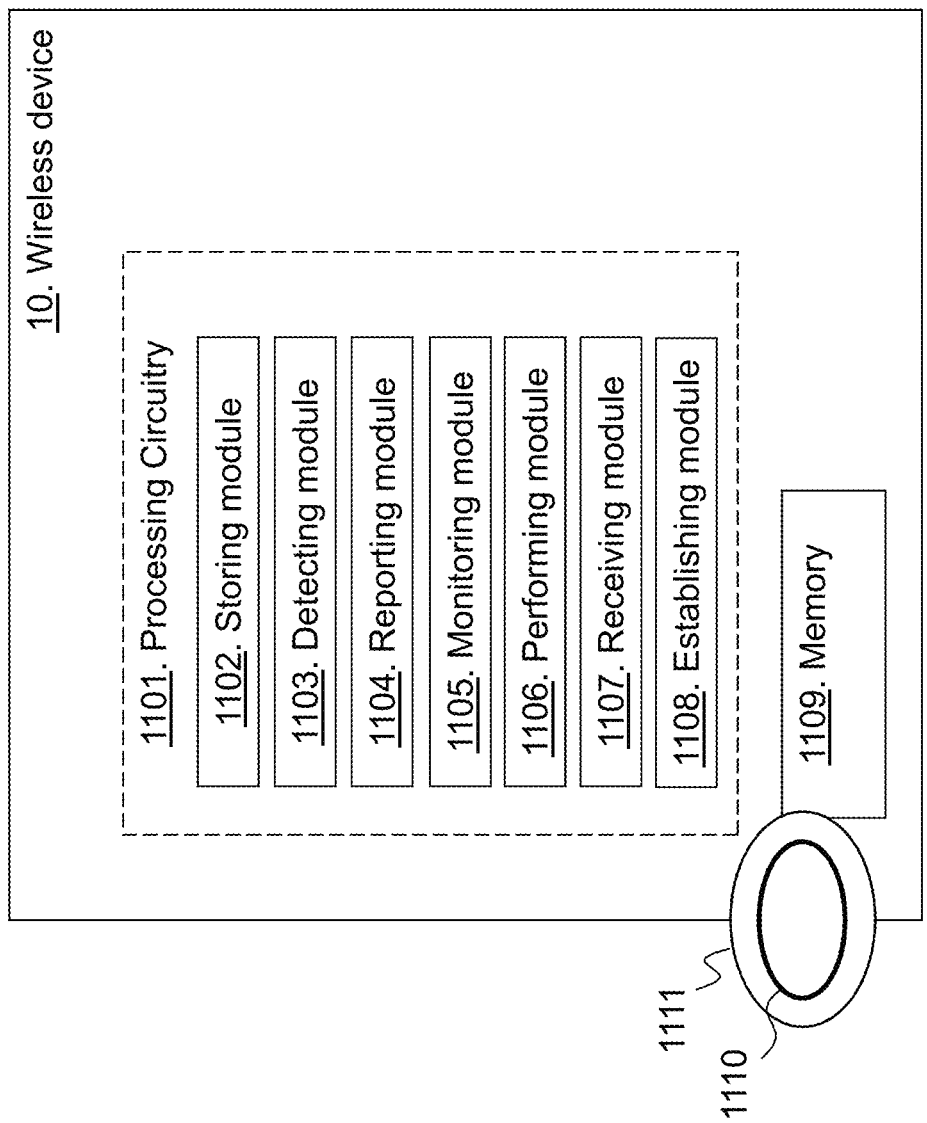
FIG. 11 is a block diagram depicting a wireless device according to embodiments herein.

FIG. 11 is a block diagram depicting the wireless device 10 for handling communication in the wireless communication network according to embodiments herein.

The wireless device 10 may comprise a processing circuitry 1101, e.g. one or more processors, configured to perform the methods herein.

The wireless device 10 may comprise a storing module 1102. The wireless device 10, the processing circuitry 1101, and/or the storing module 1102 is configured to store the time instant associated with the receiving event relating to reference signal detection and information related to the receiving event.

The wireless device 10 may comprise a detecting module 1103. The wireless device 10, the processing circuitry 1101, and/or the detecting module 1103 is configured to detect the connection event related to the connection of the wireless device 10. The wireless device 10, the processing circuitry 1101, and/or the detecting module 1103 may be configured to detect the connection event by being configured to detect the radio link problem of the connection or that the connection is released from the connected state.

The wireless device 10 may comprise a reporting module 1104, e.g. a transmitter or a transceiver. The wireless device 10, the processing circuitry 1101, and/or the reporting module 1104 is configured to report the time instant and the information to a radio network node, i.e. the second radio network node 13, in the wireless communication network 1.

The wireless device 10 may comprise a monitoring module 1105. The wireless device 10, the processing circuitry 1101, and/or the monitoring module 1105 may be configured to monitor reference signals from the serving radio network node in the wireless communication network 1. The receiving event may then comprise receiving the identifier of the serving radio network node, and the wireless device 10, the processing circuitry 1101, and/or the storing module 1102 may be configured store the time instant when the wireless device 10 receives the identifier of the serving radio network node. The stored information may comprise the identifier of the serving radio network node, and the wireless device 10, the processing circuitry 1101, and/or the reporting module 1104 may be configured to report the time instant and the information by being configured to report the time instant and the identifier of the serving radio network node to the radio network node i.e. the second radio network node 13.

The wireless device 10 may comprise a performing module 1106. The wireless device 10, the processing circuitry 1101, and/or the performing module 1106 may be configured to perform the measurement of the first reference signal. The receiving event may then be performing the measurement of the first reference signal, and the information related to the receiving event comprises information associated with the first reference signal, e.g. measurement and RS ID or Beam ID.

The wireless device 10 may comprise a receiving module 1107, e.g. a receiver or a transceiver. The wireless device 10, the processing circuitry 1101, and/or the receiving module 1107 may be configured to receive, from the serving radio network node, data comprising reference signals to monitor and/or an identifier of the serving radio network node.

The wireless device 10 may comprise an establishing module 1108. The wireless device 10, the processing circuitry 1101, and/or the establishing module 1108 may be configured to establish the signaling connection to the radio network node after detecting the connection event and being configured to report the time instant and information over the established signaling connection.

The wireless device 10 further comprises a memory 1109. The memory comprises one or more units to be used to store data on, such as time instants, the information, strengths or qualities, the data, connection information, events, applications to perform the methods disclosed herein when being executed, and similar.

The methods according to the embodiments described herein for the wireless device 10 are respectively implemented by means of e.g. a computer program 1110 or a computer program product, comprising instructions, i.e., software code portions, which, when executed on at least one processor, cause the at least one processor to carry out the actions described herein, as performed by the wireless device 10. The computer program 1110 may be stored on a computer-readable storage medium 1111, e.g. a disc or similar. The computer-readable storage medium 1111, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

FIG. 12 is a block diagram depicting the second radio network node 13 for handling communication in the wireless communication network according to embodiments herein.

The second radio network node 13 may comprise a processing circuitry 1201, e.g. one or more processors, configured to perform the methods herein.

The second radio network node 13 may comprise a receiving module 1202, e.g. a receiver or transceiver. The second radio network node 13, the processing circuitry 1201, and/or the receiving module 1202 is configured to receive from the wireless device 10, the time instant associated with the receiving event relating to reference signal detection at the wireless device and information related to the receiving event. The reference signal is associated with the first radio network node.

The second radio network node 13 may comprise an initiating module 1203. The second radio network node 13, the processing circuitry 1201, and/or the initiating module 1203 is configured to initiate the process to establish the neighbour relationship of the first radio network node and a neighbouring radio network node, or of beams, in the wireless communication network using the received time instant and the received information. The beams being related to the RS of the first radio network node and a different radio network node.

The second radio network node 13 may comprise an establishing module 1204. The second radio network node 13, the processing circuitry 1201, and/or the initiating module 1203 may be configured to initiate the process by being configured to signal the time instant and the information to the network node, such as the first radio network node 12 or the controlling network node 17, to retrieve identity of the first radio network node 12 associated to the receiving event. The second radio network node 13, the processing circuitry 1201, and/or the establishing module 1204 may then be configured to establish the neighbour relationship with the first radio network node associated to the receiving event using the retrieved identity.

The second radio network node 13, the processing circuitry 1201, and/or the initiating module 1203 may be configured to initiate the process by being configured to signal the time instant and the information to the third radio network node 15 allowing the third radio network node to establish the neighbour relationship to the first radio network node 12 based on the signaled time instant and the signaled information.

The second radio network node 13 further comprises a memory 1205. The memory comprises one or more units to be used to store data on, such as time instants, the information, strengths or qualities, the data, IDs, connection information, events, applications to perform the methods disclosed herein when being executed, and similar.

The methods according to the embodiments described herein for the second radio network node 13 are respectively implemented by means of e.g. a computer program 1206 or a computer program product, comprising instructions, i.e., software code portions, which, when executed on at least one processor, cause the at least one processor to carry out the actions described herein, as performed by the second radio network node 13. The computer program 1206 may be stored on a computer-readable storage medium 1207, e.g. a disc or similar. The computer-readable storage medium 1207, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

FIG. 13 is a block diagram depicting the network node such as the first radio network node 12 or the controlling network node 17 for handling communication in the wireless communication network according to embodiments herein.

The network node may comprise a processing circuitry 1301, e.g. one or more processors, configured to perform the methods herein.

The network node may comprise a storing module 1302. The network node, the processing circuitry 1301, and/or the storing module 1302 is configured to store the indication of the reference signal and the timing information defining when the reference signal was transmitted from the first radio network node or another radio network node such as a neighbouring radio network node to the first radio network node 12. The network node, the processing circuitry 1301, and/or the storing module 1302 may further be configured to store additional information being one or more of: periodicity of transmissions of the reference signal and transmission area of the reference signal.

The network node may comprise a receiving module 1303. The network node, the processing circuitry 1301, and/or the receiving module 1303 is configured to receive, from the second radio network node 13 e.g. over an X2-link, the time instant associated with the receiving event relating to reference signal detection at the wireless device 10 and information related to the receiving event.

The network node may comprise a providing module 1304. The network node, the processing circuitry 1301, and/or the providing module 1304 is configured to provide the identity of the first or the other radio network node based on the stored indication of the reference signal and the stored timing information mapping to the received time instant and received information related to the receiving event.

The network node further comprises a memory 1305. The memory comprises one or more units to be used to store data on, such as time instants, the information, strengths or qualities, the data, RS IDs, timing information, connection information, events, applications to perform the methods disclosed herein when being executed, and similar.

The methods according to the embodiments described herein for the network node are respectively implemented by means of e.g. a computer program 1306 or a computer program product, comprising instructions, i.e., software code portions, which, when executed on at least one processor, cause the at least one processor to carry out the actions described herein, as performed by the network node. The computer program 1306 may be stored on a computer-readable storage medium 1307, e.g. a disc or similar. The computer-readable storage medium 1307, having stored thereon the computer program, may comprise the instructions which, when executed on at least one processor, cause the at least one processor to carry out the actions described herein, as performed by the network node. In some embodiments, the computer-readable storage medium may be a non-transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

Antenna node: As used herein, an "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication in a wireless communication network, the method comprising:
   obtaining timing data indicating a time instant associated with a receiving event relating to a reference signal transmitted by a first radio network node providing radio coverage over a service area;
   storing the timing data indicating the time instant associated with the receiving event;
   storing information related to the receiving event;
   detecting a connection event related to a connection of the wireless device;
   wirelessly establishing a signaling connection to a second radio network node providing radio coverage over a service area; and
   reporting the time instant and the information to the second radio network node in the wireless communication network, wherein reporting the time instant to the second radio network node comprises transmitting to the second radio network node a message comprising the timing data indicating the time instant.

2. The method of claim 1, wherein the detecting the connection event comprises detecting a radio link problem of the connection or that the connection is released from a connected state.

3. The method of claim 1, further comprising
   monitoring reference signals from the first radio network node in the wireless communication network; and wherein the receiving event comprises receiving an identifier of the first radio network node, and the storing the timing data comprises storing the timing data indicating when the wireless device receives the identifier of the first radio network node.

4. The method of claim 3, wherein the stored information comprises the identifier of the first radio network node, and the reporting the time instant and the information comprises reporting the time instant and the identifier of the first radio network node to the second radio network node.

5. The method of claim 1, further comprising
   performing a measurement of the reference signal, and the receiving event comprises the performing of the measurement of the reference signal, and the information related to the receiving event comprises information associated with the reference signal.

6. The method of claim 1, further comprising
   receiving, from the first radio network node, data comprising reference signals to monitor and/or an identifier of the first radio network node.

7. The method of claim 1, wherein the reporting the time instant and information uses the established signaling connection.

8. The method of claim 1, further comprising:
receiving the information related to the receiving event, wherein the time instant defines a time of the receiving.

9. The method of claim 1, wherein the time instant is expressed in relation to a network time reference.

10. The method of claim 9, wherein the network time reference comprises a system frame number.

11. A method performed by a second radio network node for handling communication in a wireless communication network, the method comprising:
receiving, from a wireless device, timing data indicating a time instant associated with a receiving event relating to reference signal detection at the wireless device and information related to the receiving event, which reference signal is associated with a first radio network node; and
initiating a process to establish a neighbour relationship of the first radio network node and a neighbouring radio network node, or of beams, in the wireless communication network using the received timing data and the received information.

12. The method of claim 11, wherein the initiating comprises signaling the time instant and the information to a network node to retrieve identity of the first radio network node associated to the receiving event, and the method further comprises establishing a neighbour relationship with the first radio network node associated to the receiving event using the retrieved identity, wherein establishing the neighbour relationship with the first radio network node comprises establishing a connection with the first network node.

13. The method of claim 11, wherein the initiating comprises signaling the time instant and the information to a third radio network node allowing the third radio network node to establish a neighbour relationship to the first radio network node based on the signaled time instant and the signaled information.

14. A method performed by a network node for handling communication in a wireless communication network, the method comprising
storing an indication of a reference signal and a timing information defining when the reference signal was transmitted from a first radio network node or another radio network node;
receiving, from a second radio network node, timing data indicating a time instant associated with a receiving event relating to reference signal detection at a wireless device and information related to the receiving event; and
providing an identity of the first or the other radio network node based on the stored indication of the reference signal and the stored timing information mapping to the time instant and received information related to the receiving event.

15. The method of claim 14, wherein the network node further stores additional information being one or more of: periodicity of transmissions of the reference signal and transmission area of the reference signal.

16. A wireless device for handling communication in a wireless communication network, the wireless device being configured to:
obtain timing data indicating a time instant associated with a receiving event relating to a reference signal transmitted by a first radio network node providing radio coverage over a service area;
store the timing data indicating the time instant associated with the receiving event;
store information related to the receiving event;
detect a connection event related to a connection of the wireless device;
wirelessly establish a signaling connection to a second radio network node providing radio coverage over a service area; and
report the time instant and the information to the second radio network node in the wireless communication network, wherein
the wireless device is configured to report the time instant to the second radio network node by transmitting to the second radio network node a message comprising the timing data indicating the time instant.

17. The wireless device of claim 16, being configured to detect the connection event by being configured to detect a radio link problem of the connection or that the connection is released from a connected state.

18. The wireless device of claim 16, further being configured to
monitor reference signals from the first radio network node in the wireless communication network; and wherein the receiving event comprises receiving an identifier of the first radio network node, and being configured to store the timing data when the wireless device receives the identifier of the first radio network node.

19. The wireless device of claim 18, wherein the stored information comprises the identifier of the first radio network node, and being configured to report the time instant and the information by being configured to report the time instant and the identifier of the first radio network node to the second radio network node.

20. The wireless device of claim 16, further being configured to
perform a measurement of the reference signal, and the receiving event comprises performing the measurement of the reference signal, and the information related to the receiving event comprises information associated with the reference signal.

21. The wireless device of claim 16, further being configured to
receive, from the first radio network node, data comprising reference signals to monitor and/or an identifier of the first radio network node.

22. The wireless device of claim 16, wherein the reporting the time instant and information uses the established signaling connection.

23. A second radio network node for handling communication in a wireless communication network, the second radio network node being configured to:
receive from a wireless device, timing data indicating a time instant associated with a receiving event relating to reference signal detection at the wireless device and information related to the receiving event, which reference signal is associated with a first radio network node; and to
initiate a process to establish a neighbour relationship of the first radio network node and a neighbouring radio network node or of beams in the wireless communication network using the received timing data and the received information.

24. The second radio network node of claim 23, being configured to initiate the process by being configured to signal the time instant and the information to a network node to retrieve identity of the first radio network node associated to the receiving event, and further being configured to establish a neighbour relationship with the first radio network node associated to the receiving event using the retrieved identity.

25. The second radio network node of claim 23, being configured to initiate the process by being configured to signal the time instant and the information to a third radio network node allowing the third radio network node to establish a neighbour relationship to the first radio network node based on the signaled time instant and the signaled information.

26. A network node for handling communication in a wireless communication network, the network node being configured to:
    store an indication of a reference signal and a timing information defining when the reference signal was transmitted from a first radio network node or another radio network node;
    receive, from a second radio network node, timing data indicating a time instant associated with a receiving event relating to reference signal detection at a wireless device and information related to the receiving event; and
    provide an identity of the first or the other radio network node based on the stored indication of the reference signal and the stored timing information mapping to the time instant and received information related to the receiving event.

27. The network node of claim 26, being further configured to store additional information being one or more of: periodicity of transmissions of the reference signal and transmission area of the reference signal.

28. A computer program product comprising a non-transitory computer readable medium comprising a computer program comprising instructions, which, when executed on at least one processor, cause the at least one processor to carry out the method of claim 1.

29. A computer program product comprising a non-transitory computer readable medium comprising a computer program comprising instructions, which, when executed on at least one processor, cause the at least one processor to carry out the method of claim 11.

* * * * *